US 12,444,285 B2

(12) United States Patent
Statter

(10) Patent No.: US 12,444,285 B2
(45) Date of Patent: Oct. 14, 2025

(54) NETWORKS, SYSTEMS AND METHODS FOR ENHANCED WILDFIRE MITIGATION, PROTECTION AND SUPPRESSION

(71) Applicant: HAS LLC, Jackson, WY (US)

(72) Inventor: Harry A. Statter, Jackson, WY (US)

(73) Assignee: HAS LLC, Jackson, WY (US)

( * ) Notice: Subject to any disclaimer, the term of this patent is extended or adjusted under 35 U.S.C. 154(b) by 0 days.

(21) Appl. No.: 17/875,966

(22) Filed: Jul. 28, 2022

(65) Prior Publication Data

US 2023/0186744 A1  Jun. 15, 2023

Related U.S. Application Data

(60) Provisional application No. 63/226,730, filed on Jul. 28, 2021.

(51) Int. Cl.
*G08B 17/00* (2006.01)
*G08B 25/10* (2006.01)
*G08B 31/00* (2006.01)

(52) U.S. Cl.
CPC ........... *G08B 17/005* (2013.01); *G08B 25/10* (2013.01); *G08B 31/00* (2013.01)

(58) Field of Classification Search
CPC ...... G08B 17/005; G08B 25/10; G08B 31/00; G08B 21/10; G08B 25/14
See application file for complete search history.

(56) References Cited

U.S. PATENT DOCUMENTS

| 4,428,434 A | 1/1984 | Gelaude |
| 5,165,482 A | 11/1992 | Smagac |
| 5,931,233 A | 8/1999 | La Bonte |
| 6,523,616 B1 | 2/2003 | Walllace |
| 9,619,996 B1 | 4/2017 | Smith |
| 10,016,643 B2 | 7/2018 | Smith |
| 10,042,086 B1 * | 8/2018 | Smalley ................. G01K 13/00 |
| 10,260,232 B1 | 4/2019 | Conboy |
| 10,267,034 B1 | 4/2019 | Conboy |
| 10,290,004 B1 | 5/2019 | Conboy |
| 10,332,222 B1 | 6/2019 | Conboy |

(Continued)

FOREIGN PATENT DOCUMENTS

DM    225996    5/2022

OTHER PUBLICATIONS

U.S. Appl. No. 29/813,987, Statter.

(Continued)

*Primary Examiner* — Rufus C Point
(74) *Attorney, Agent, or Firm* — Belvis Law, LLC.; Glen P. Belvis

(57) ABSTRACT

There is provided networks, systems and displays for providing derived data and predictive information for use in emergencies; and in particular for use in wildfire emergencies. More particularly, there is provided systems, equipment and networks for the monitoring and collecting of raw data regarding fire emergencies, both real time and historic. In embodiments, this raw data is then analyzed to provide derived data, predictive data, virtual data, and combinations and variations of this data, which depending upon the nature of this data may be packaged, distributed, displayed and used in various setting and applications to mitigate, avoid and manage the emergency, including a wildfire emergency.

26 Claims, 23 Drawing Sheets

(56) References Cited

U.S. PATENT DOCUMENTS

| | | |
|---|---|---|
| 10,430,757 B2 | 10/2019 | Conboy |
| 10,653,904 B2 | 5/2020 | Conboy |
| 10,695,597 B2 | 6/2020 | Conboy |
| 10,814,150 B2 | 10/2020 | Conboy |
| 10,899,038 B2 | 1/2021 | Conboy |
| 10,919,178 B2 | 2/2021 | Conboy |
| 11,247,087 B2 | 2/2022 | McDonald |
| 11,295,131 B1 | 4/2022 | Dhawan |
| 11,395,931 B2 | 7/2022 | Conboy |
| 11,400,324 B2 | 8/2022 | Conboy |
| 11,633,636 B2 | 4/2023 | Conboy |
| 11,638,844 B2 | 5/2023 | Conboy |
| 11,642,555 B2 | 5/2023 | Conboy |
| 11,654,313 B2 | 5/2023 | Conboy |
| 11,654,314 B2 | 5/2023 | Conboy |
| 11,697,039 B2 | 7/2023 | Conboy |
| 11,697,040 B2 | 7/2023 | Conboy |
| 11,697,041 B2 | 7/2023 | Conboy |
| 11,707,639 B2 | 7/2023 | Conboy |
| 11,730,987 B2 | 8/2023 | Conboy |
| 11,794,044 B2 | 10/2023 | Conboy |
| 11,826,592 B2 | 11/2023 | Conboy |
| 11,836,807 B2 | 12/2023 | Conboy |
| 11,865,390 B2 | 1/2024 | Conboy |
| 11,865,394 B2 | 1/2024 | Conboy |
| 11,911,643 B2 | 2/2024 | Conboy |
| 12,024,467 B2 | 7/2024 | Conboy |
| 12,260,723 B1* | 3/2025 | Dziadulewicz ........ A62C 37/44 |
| 2004/0163827 A1 | 8/2004 | Privalov |
| 2005/0139363 A1 | 6/2005 | Thomas |
| 2006/0113403 A1 | 6/2006 | Aamondt |
| 2009/0266563 A1 | 10/2009 | Wright |
| 2009/0321094 A1 | 12/2009 | Thomas |
| 2010/0000743 A1 | 1/2010 | Cohen |
| 2012/0261144 A1* | 10/2012 | Vian .................... G08B 17/125 |
| | | 169/43 |
| 2013/0321637 A1 | 12/2013 | Frank |
| 2014/0132409 A1 | 5/2014 | Billman |
| 2014/0209330 A1 | 7/2014 | Satter |
| 2015/0136428 A1 | 5/2015 | Connery |
| 2015/0321033 A1 | 11/2015 | Statter |
| 2016/0142612 A1 | 5/2016 | Brav |
| 2016/0304051 A1 | 10/2016 | Archer |
| 2017/0372578 A1 | 12/2017 | Klein |
| 2018/0054982 A1 | 3/2018 | Whalley |
| 2018/0063529 A1 | 3/2018 | Statter |
| 2018/0239948 A1 | 8/2018 | Ritschman |
| 2019/0168035 A1 | 6/2019 | Conboy |
| 2019/0262637 A1 | 8/2019 | Satter |
| 2020/0145493 A1* | 5/2020 | Wang ................. H04L 41/0895 |
| 2020/0155881 A1* | 5/2020 | Tohidi ................ G06F 16/9038 |
| 2020/0159397 A1 | 5/2020 | Tohidi |
| 2020/0242916 A1* | 7/2020 | Krstanovic ........ G08B 21/0453 |
| 2020/0342744 A1* | 10/2020 | Patel .................... G08B 17/005 |
| 2022/0001222 A1 | 1/2022 | Dor |
| 2023/0092407 A1 | 3/2023 | Statter |
| 2023/0186744 A1 | 6/2023 | Statter |
| 2023/0293924 A1 | 9/2023 | Statter |

OTHER PUBLICATIONS

U.S. Appl. No. 29/813,994, Statter.
U.S. Appl. No. 29/813,997, Statter.
U.S. Appl. No. 29/814,002, Statter.
U.S. Appl. No. 29/814,003, Statter.

* cited by examiner

NETWORKS, SYSTEMS AND METHODS FOR ENHANCED WILDFIRE MITIGATION, PROTECTION AND SUPPRESSION

This application claims priority to and under 35 U.S.C. § 119(e)(1) the benefit of U.S. provisional application Ser. No. 63/226,730 filed Jul. 28, 2021, the entire disclosure of which is incorporated herein by reference.

BACKGROUND OF THE INVENTION

Field of the Invention

The present inventions relate to multivariable component systems and activities for the management, mitigation, and suppression of wildfires.

As used herein, unless specified otherwise, the terms "multivariable component system", "multivariable component activities", "multivariable components" and similar such terms are to be given their broadest possible meanings, and would include, for example, the flow of motorized vehicle traffic in a traffic pattern, a particular area or location, or highway system; the movement of people in a particular area, location or within a structure; the movement and location of emergency response equipment and personnel including fire trucks, police, rescue, medical, ambulances, heavy equipment, and flight equipment (e.g., air planes and helicopters); the location and path of a wildfire.

The term "wildfire" as used herein, unless specified otherwise should be given its broadest possible meaning and would include any outdoor fire, and any fire that is located outside of a structure, this would include for example brush fires, forest fires, and grass fires. The term wildfire, however, as used herein, unless specified otherwise, would further include structure fires that were caused directly or indirectly by a wildfire.

In a wildfire, and in particular in situations where the fire is threatening or active in a populated area, there are highly complex and unpredictable multi-variable, multi-actor events that can take place, these multi-variable, multi-actor events are further complicated by a loss of visibly that typically occurs at, near and in a wildfire. Events and variables, such as temperature, humidity, wind speed, location of the fire, available fuel for the fire, terrain, movement and location of fire crews, road closures, traffic conditions, movement and location of people and private vehicles, as well as, evolving strategies to combat the wildfire and protect life and property, typically by several different agencies or emergency response groups makes it very difficult, if not impossible to effectively and efficiently manage the wildfire, the people and property involved with the wildfire, and determine, implement and adapt the most effective integrated strategy and response to protect life and property from the wildfire. Although emergency response and fire management agencies and groups do an admirable, commendable and heroic job in response to a wildfire, all would agree that better, more efficient, more effective and safer integrated strategies and responses are needed. This failing by those of skill in the art of emergency response and fire management to provide integrated and comprehensive, solutions and predictions regarding trends and conditions relating directly to the fire, e.g., fire intensity, wind, humidity, fire direction, persons at risk in the fire and directly in the path of the fire, structures in the fire and directly in the fires path, fuel sources in fire path, as well as, peripheral matters to the fire, such as evacuation routes, traffic, occupancy, type of structure, static fire protections systems (i.e., structure or areas with their own fire protection system such a sprinklers, foam, flowing water), access to the active fire area and predicted path of the fire for response teams, the movement of response teams, and logistics of supplies. This failing occurs, in spite of the fact, and perhaps because of the fact, that there is a large amount of real time raw data and historic raw data available about a fire, fire conditions, traffic, logistics, etc.

This large stream, or amount, of raw data provides little or no determinative information or predictive value. Further, and in general, the trend in the art of data management, media and public information has been to provide more and more data, and to present this data in fancier packaging, images and graphics. While this more visually stimulating presentation of raw data may be entertaining to some, its large volume may be confusing to others. Thus, in spite of the direction of the art to provide larger and larger amounts of raw data, and to do so in more visually stimulating ways, there exists a long felt and unmet need for determinative information of predictive value in wildfire mitigation and management, either or both: (i) directly related to the fire, for example, fire intensity, wind, humidity, fire direction, predicted path of the fire, location of embers, direction of embers, persons at risk in the fire and directly in the path of the fire, structures in the fire and directly in the path of the path, fuel sources in the fire path, water supply and usage in the fire area, power grid in the fire area; and, (ii) peripherally associated with or indirectly related to the fire, for example, evacuation routes, traffic, occupancy, type of structure, static fire protections systems (e.g., structure or areas with their own fire protection system such a sprinklers, foam, flowing water), access and egress for the active fire area, access and egress for the area in the predicted path of the fire, response team (e.g., ambulance, fire, medical, evacuation, heavy equipment, air support, police) movement, response team location, power grid operability, water availability, and logistics of supplies. It being understood that in fast moving and evolving wildfire situations, indirectly related matters can, and often do, become directly related matters.

This long felt and unmet need is exacerbated further by the rapidly increasing channels and access that professionals, public agencies, and the public (i.e., individuals) have through cable, radio, satellite radio, web pages, applications, television (cable and broadcast), mobile devices, laptops, iPads, cell phones, smart phones, watches, vehicle systems (e.g., navigation systems, self-driving systems, and interactive systems such as ONSTAR), and other portable and fixed data interfaces. Portable or mobile devices such as vehicle systems, phones, smart phones, tablets, iPads, laptops, watches and other portable devices are often unified by their ability to process data and structure and present content in the core internet technology of HTML5, whereas previous generation displays could be fragmented with heavier, less responsive, and generally more clunky platforms. These portable data interfaces present an even larger challenge to reducing the clutter, confusion, and general data overload to a user because often value-added data must be presented in more constrained visual real estate such as a mobile device screen and other portable data interface screens.

Furthermore, the clutter, confusion, and general data overload to a user can obscure desired user engagement mechanisms such as evacuation route planning, where an individual cannot easily determine their standing in real-time relative to the fire, traffic conditions and fire response teams.

Prior to the present inventions, no mechanism exists to create fully integrated, based upon historic data, real time date and both, systems for wildfire mitigation, management including direct and peripheral matters and activities. Further, for the purpose of planning and developing emergency plans, prior to the present inventions there exists no mechanism to create fully integrated, based upon historic data, hypothetical date, and both, virtual wildfire scenarios for the purpose of, by way of example, creating emergency response plans and training exercises.

As used herein, unless specified otherwise, the terms "actual data", "actual information", "raw data", "raw information", and similar such terms are to be given their broadest possible meaning and would include information obtained from direct and indirect observation, monitoring, measuring, sensing and combinations and variations of these. Actual data would include, for example: data from external fire suppression systems; global positioning satellite (gps) data; traffic sensor data; traffic camera data; traffic and map application data (such as WAZE, google maps); atmospheric temperature data, atmospheric wind data; atmospheric humidity data; weather data; transponder data, fire systems sensor data; sensors located in the environment data; data from individuals and professionals; cell phone data, such as location, speed, direction); and data from other devices, such as optical switches, laser radar, laser range finding and laser tracking, magnetic sensors such as those which may be embedded in a road surface, visual data; telemetry, such as when sensor, probe and monitor data is transmitted to a receiver, and radar measurement and monitoring systems. Actual data may also be logged on-board vehicle data, or data at a monitoring station that is stored and downloaded after fire management or emergency activity to become historic data. Actual data and information may be provided, received or obtained real-time, it may be provided, received or obtained as historic data or stored actual information from a prior event, and combinations and variations of these. Actual data and information may be in compilations of data, which may further be sorted, indexed, tagged or otherwise categorized.

As used herein, unless specified otherwise, the terms "derived data", "derived information" and similar such terms are to be given their broadest possible meaning and would include raw data upon which a calculation or operation has been performed. For example, if water consumption rate, e.g., gallons used per hour, is calculated by performing the operation of obtaining raw data for the amount of water present $w_1$, and $w_2$ at time $t_1$ and $t_2$; then calculating the amount of water used over time interval $t_2-t_1$, the resultant value, e.g., gals/hour, would be an example of derived data. Alternatively, if a flow sensor is installed on the water line or tank that directly measures the amount of water flowing from the line or tank, the data from that flow sensor would be actual data, not derived data. Accordingly, values such as averages are considered derived data, because they are derived from one or more operations on raw data. Although examples of simple (one, two or three) operations are provided above, it should be understood that tens, hundreds, thousands, and hundreds of thousands of operations or calculations, or more, may be performed on data to obtain derived data.

When derived data is stored, it becomes historic data, but also remains derived data, i.e., historic derived data. Derived data can be subjected to operations and calculations with the resulting information being derived data. Further, derived data, for example from real time raw data, can be combined with historic data, raw or derived, e.g., how a wildfire in a similar geographic setting behaved under similar environmental conditions, and used in operations and calculations to render additional derived data.

Derived data, from real time raw data, from historic data, and from combinations and variations of these, may be determinative information of predictive value to a multivariable component system, and in particular predictive value to a wildfire.

As used herein, unless specified otherwise, the terms "predictive data", "predictive information", "determinative information" and "determinative data" are to be given there broadest possible meanings and would include derived data and information that provides, for example, information about trends, information leading to future outcome, future events, predicted events, trends leading to further events, normalized real time performance as an indicator of future actions or events, and similar mathematically derived and predictive values that are, or are at least in part based upon, derived data. Predictive data and information would include derived data in the form of probabilities of likely outcome, windows of likely outcome and similar types of values. Predictive data may be micro in nature, macro in nature, cumulative in nature, and combinations and variations of these. Thus, for example, predicting that a particular fire crew will be positioned at a certain location at a certain time would be predictive information that is micro in nature. Using this micro predictive information with other predictive information, derived data, and raw data to predict that X homes need to be evacuated at time t, X' homes need to have external fire management systems turned on at time $t_1$, and Y fire response teams need to be at the area where the X homes are located at time $t_2$ would be an example of predictive information that is macro in nature. Predictive information about progression of a wildfire, embers, the evacuation of residents, traffic flow on ingress and egress routes, the activation of external fire management systems, and the positing of fire response teams would be a further example of predictive information that is macro in nature, and would also be comprehensive macro predictive information, and integrated macro predictive information.

As used herein, unless specified otherwise, the terms "external fire management system" ("EFMS"), "external fire suppression system", "static fire protection system", "fixed fire protection system", "structure fire protection system" and similar such terms, should be given their broadest possible meaning, and would include systems that provide a fire suppressant medium (e.g., water) on the outside of structures, to the adjacent grounds and both. The adjacent grounds would include land area, vegetation, and materials located in contact with, adjacent to, near and around the structure, e.g., as far as about 10 feet, about 20 feet, and about 50 feet, from 10 feet to 30 feet, from 5 feet to 75 feet, or more from the exterior walls of the structure. These systems can for example provide water in the form of sprays, mists, streams, sheets and combinations and variations of these to the structures and adjacent grounds. The systems can provide fire suppressant foam to the outside of structures and to the adjacent grounds. These systems can provide combinations of water and foam. These systems can, and typically do have, sensors and monitors, that provide data about the system, its activation, its rate of use of fire suppression medium (e.g., water or foam), the temperature(s) in and around the structure. These systems may also have internal fire suppression systems for addressing fires within the structure, as well as, the exterior of the structure and adjacent ground. It is understood that the exterior or outside of the structure includes one or more of the roof, exterior walls, outer surfaces of outside walls, gutters, garage doors, or any portion or part of the structure that is exposed to the outside environment, and thus likely to be exposed to the wildfire and embers. An example of a fixed fire protection system would be those provided by Frontline Fire Protection LLC., in Casper Wyoming.

As used herein, unless specified otherwise, the terms "virtual data", "virtual entity" and similar such terms are to be given their broadest possible meaning and would include any types of data that are generated from, capture, result from, or relate to virtual activities. Thus, for example, if raw data, derived data and predictive data are used to conduct a virtual wildfire response, the information and data regarding that virtual response would be considered virtual data and information. Thus, it can be seen that there may be historic virtual data (e.g., last year's emergency virtual drill) and real time virtual data (e.g., a virtual drill being conducted real time). There may also be raw virtual data, derived virtual data, and predictive virtual data. Essentially, it is contemplated that all of the data, computations and predictions from the real world, may be used in a similar manner in a virtual world for planning, drilling and practicing purposes. It is further contemplated that these virtual activities can be used by professionals, as well as, private individuals, much as flight simulators can be used by pilots for training purposes, and amateurs for entertainment purposes.

As used herein, unless specified otherwise, the terms "node", "communication node", "point on a network", "communication point", "data point", "network address" and similar such terms are to be given their broadest possible meanings, and would include for example, sensors, processors, data receiving assemblies, data transmitting assemblies, data receiving/processing/transmitting assemblies, GUI, satellite dishes, cable boxes, transmitters, TVs, computers, gaming stations, gps transmitters, cellular devices, cellular phones, tablets, iPhones®, iPad®, I/O (input/output) devices, and data storage devices. A node may also be a structure or location where other nodes may be present, for example a structure with an external fire management system, having its own control network of sensors, activators, cell phone applications, and I/O devices.

As used herein, unless specified otherwise, the term "GUI" (graphic user interface) is to be given its broadest possible meaning and would include for example devices that are fully interactive, partially interactive and not interactive, it would include all types of displays and monitors (both with and without keyboards), it would include touch screen monitors and even heads up displays and Google Glass. Braille devices, and other device for assisting in and communicating with the visually impaired, or persons with other disabilities, are considered herein to be a GUI.

As used herein, unless specified otherwise, the terms "network", "network pathway", "pathway" and similar terms are to be given there broadest meaning and would include any wires, optical, wireless, fibers, light waves, magnetic wave, or other medium over which data can be transmitted, combinations of various types of different types of these mediums, which would include for example, satellite broadcasts, conventional television signals, cable networks, telephone networks, DSL networks, the internet, the world wide web, intranets, private networks, local networks, cellular, Ethernet, node to node links, radio, telegraph, power lines, and other presently known or later developed technologies for transmitting, receiving and/or sharing data and information.

As used herein, unless specified otherwise the terms "adaptative strategy", "automated adaptive strategy", "responsive adaptive strategy" mean instructions, plans and strategies that are based upon predictive data, derived data or both, and that change (e.g., are updated) over a period of time during a wildfire event, based upon predictive, derived and both data that is obtained after the start of the wildfire event, after the initial implementation of a strategy, and both. Adaptive strategies can be updated once, twice, tens of time and thousands of times. The updates can occur in any time interview from days, to hours to minutes to seconds to fractions of a second.

Generally, the term "about" and the symbol "—" as used herein, unless specified otherwise, is meant to encompass the greater of a variance or range of ±10%, or the experimental or instrument error associated with obtaining the stated value.

As used herein, unless expressly stated otherwise terms such as "at least", "greater than", also mean "not less than", i.e., such terms exclude lower values unless expressly stated otherwise.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard temperature and pressure.

As used herein, unless specified otherwise, the recitation of ranges of values, a range, from about "x" to about "y", and similar such terms and quantifications, serve as merely shorthand methods of referring individually to separate values within the range. Thus, they include each item, feature, value, amount or quantity falling within that range. As used herein, unless specified otherwise, each and all individual points within a range are incorporated into this specification, and are a part of this specification, as if they were individually recited herein.

This Background of the Invention section is intended to introduce various aspects of the art, which may be associated with embodiments of the present inventions. Thus, the foregoing discussion in this section provides a framework for better understanding the present inventions, and is not to be viewed as an admission of prior art.

SUMMARY

There has been a long standing, ever increasing and unmet need for systems, networks and methods that can provide derived data, predictive data, adaptive strategies, virtual data and combinations and variations of these, for multivariable component systems, such as wildfire mitigation, management and suppression, including wildfire emergency response management. This long standing and unmet need is believed to be present across all aspects of wildfire mitigation, management and suppression, including for example: activation of external fire management systems; management of ingress and egress routes; evacuations, including notices and plans; response team deployment and supplies, to name a few. The present inventions meet these and other needs. Thus, there is provided a system for obtaining, evaluating and displaying in a predictive manner, information and data regarding fire emergencies, the system having: a plurality of units configured to provide raw data regarding a fire; wherein each unit comprises a communication node on a communication network; wherein at least one of the plurality of units is a mobile unit, having a processor and a GUI; and, wherein at least one of the plurality of units is a fixed unit having a processor and a GUI; a source of derived data regarding one or more of the fire location, a weather condition, a fire movement, a path of a fire, a traffic condition, available water, water usage, a power grid, and electrical usage; wherein the source of derived data comprises a communication node on the communication network; a processor having a communication node on the communication network, thereby placing the processor in communication with the source of derived data and at least one of the plurality of units; the processor capable of performing a first predictive computation to determine a change of state event from the raw data and the derived data; and, whereby the processor determines predictive information having a probability for the change of state event, and wherein the processer communicates the predictive information to the network, for display by one or more of the units.

Additionally, there is provided a system for obtaining, evaluating and displaying information and data regarding wildfires, EFMSs and mobile units, the system having: a plurality of mobile units configured to receive and transmit information, data or both regarding a wildfire, an EFMS or both, and over a network; wherein the units comprise a node on the network; wherein the units comprise a means to determine the location of the unit; wherein the unit having a processor, a memory device and a GUI; wherein the information or data comprises one or more of a location of a fire, a location of smoke, a location of embers, a direction of movement of a fire, and an evacuation route; a plurality of fixed units configured to receive and transmit information and data over the network; wherein each unit comprises a node on the network; wherein each units having a processor and a memory device; and, wherein each unit is a component of an EFMS; and, wherein at least one of the mobile units is in control communication with at least one of the fixed units.

Moreover, there is provided a method for obtaining, evaluating and displaying information and data regarding wildfires, EFMSs and mobile units, the method having: a plurality of mobile units receiving and transmiting information, data or both regarding a wildfire, an EFMS or both, and over a network; wherein the units comprise a node on the network; wherein the units comprise a means to determine the location of the unit; wherein the unit having a processor, a memory device and a GUI; wherein the information or data comprises one or more of a location of a fire, a location of smoke, a location of embers, a direction of movement of a fire, and an evacuation route; a plurality of fixed units configured to receive and transmit information and data over the network; wherein each unit comprises a node on the network; wherein each units having a processor and a memory device; and, wherein each unit is a component of an EFMS; and, wherein at least one of the mobile units is in control communication with at least one of the fixed units.

Still further, there is provided a method for obtaining, evaluating and displaying information and data regarding wildfires, EFMSs and mobile units, the methods having: a plurality of mobile units receiving and transmitting information, data or both regarding a wildfire, an EFMS or both, and over a network; wherein the units comprise a node on the network; wherein the units comprise a means to determine the location of the unit; wherein the unit having a processor, a memory device and a GUI; wherein the information or data comprises one or more of a location of a fire, a location of smoke, a location of embers, a direction of movement of a fire, and an evacuation route; a plurality of fixed units configured to receive and transmit information and data over the network; wherein each unit comprises a node on the network; wherein each units having a processor and a memory device; and, wherein each unit is a component of an EFMS; and, wherein at least one of the mobile units is in control communication with at least one of the fixed units.

Yet additionally, there is provided a system for obtaining, evaluating and displaying information and data regarding wildfires, EFMSs and mobile units, the system having: a plurality of mobile units configured to receive and transmit information, data or both regarding a wildfire, an EFMS or both, and over a network; wherein the units comprise a node on the network; wherein the units comprise a means to determine the location of the unit; wherein the unit having a processor, a memory device and a GUI; wherein the information or data comprises one or more of a location of a fire, a location of smoke, a location of embers, a direction of movement of a fire, and an evacuation route; a plurality of fixed units configured to receive and transmit information and data over the network; wherein each unit comprises a node on the network; wherein each units having a processor and a memory device; and, wherein each unit is a component of an EFMS; and, wherein at least one of the mobile units is in control communication with at least one of the fixed units.

Additionally, there is provided a system for obtaining, evaluating and displaying in a predictive manner, information and data regarding an emergency, the system having: a plurality of units configured to provide raw data regarding the emergency; wherein each unit comprises a communication node on a communication network; wherein at least one of the plurality of units is a mobile unit, having a processor and a GUI; and, wherein at least one of the plurality of units is a fixed unit having a processor and a GUI; a source of derived data regarding one or more of a weather condition, a water level, a tidal condition, a seismic activity, a geologic condition, a river level, a traffic condition, water usage, an electrical usage, and an electric grid; wherein the source of derived data comprises a communication node on the communication network; a processor having a communication node on the communication network, thereby placing the processor in communication with the source of derived data and at least one of the plurality of units; the processor capable of performing a first predictive computation to determine a change of state event from the raw data and the derived data; and, whereby the processor determines predictive information having a probability for the change of state event, and wherein the processor communicates the predictive information to the network, for display by one or more of the units.

Moreover, there is provided a system for obtaining, evaluating and displaying information and data regarding emergencies and mobile units, the system having: a plurality of mobile units configured to receive and transmit information, data or both regarding an emergency over a network; wherein the units comprise a node on the network; wherein the units comprise a means to determine the location of the unit;

wherein the unit having a processor, a memory device and a GUI; wherein the information or data comprises one or more of a weather condition, a water level, a tidal condition, a seismic activity, a geologic condition, a river level, a traffic condition, water usage, an electrical usage, and an electric grid; a plurality of fixed units configured to receive and transmit information and data over the network; wherein each unit comprises a node on the network; wherein each units having a processor and a memory device; and, wherein at least one of the fixed units is associated with a structure; and, wherein at least one of the mobile units is in control communication with at least one of the fixed units.

Still further, there is provided an integrated system having a network having a plurality of nodes on the network, the integrated system having: a plurality of nodes on a network; a first node of the plurality of nodes associated with an EFMS, wherein the EFMS is associated with a structure; a second node of the plurality of nodes associated with a first mobile device having a first GUI; a third node of the plurality of nodes associated with a second mobile device having a second GUI; a fourth node of the plurality of nodes associated with a data processing assembly; whereby the data processing assembly is in communication with the EFMS, the first mobile device and the second mobile device; wherein the first and the second GUI comprises configurations to display an output, receive an input, or both of at least three of the functionalities of: fire location; I see fire; fire; heavy smoke; embers; fire danger; no fires in area; smoke in area; fire in area; fire nearby; track a wildfire; hotspots; and, wherein the second GUI comprises configurations to display an output, receive an input, or both of at least three of the functionalities of: EFMS status; EFMS system ready; EFMS sprinklers; activate systems; fire department alert; wildfire distance alert; and fire emergency checklist.

Additionally, there is provided a method of operating any of these systems to operate an EFMS.

Further, there is provided a A method of operating any of these systems to automatically operate an EFMS.

In addition, there is provided a method of operating any of these systems to provide information to a node on the network for avoiding, mitigating or both, a wildfire.

Additionally, there is provided a method of operating any of these systems to avoid, mitigate or both, a wildfire.

Furthermore, there is provided these systems and methods having one or more of the following features: wherein the raw data comprises one or more of a location of a fire, a location of smoke, a location of embers, a direction of movement of a fire, and an evacuation route; wherein the at least one of the plurality of units is also a source of derived data; wherein one of the fixed units is a EFMS; having at least ten fixed units, wherein the ten fixed units each comprises an EFMS associated with a structure; wherein at least one of the plurality of units is in control communication with an EFMS; wherein at least one of the plurality of units is in control communication with at least one of the fixed units; wherein at least one of the plurality of units is in control communication with at least one of the fixed units, wherein the at least one of the fixed units is an EFMS; wherein at least one of the plurality of units comprises a unit selected from the group consisting of cell tower, a traffic camera, a cell phone, an automobile navigation system; wherein the plurality of fixed units having at least ten EFMS; wherein the plurality of fixed units having at least ten EFMS, wherein the at least ten EFMS are all located within a 10 mile radius, and thereby define a nodal area; wherein the plurality of fixed units having at least ten EFMS, wherein the at least ten EFMS are all located within a 5 mile radius and thereby define a nodal area; wherein the plurality of fixed units having at least five EFMS, wherein the at least five EFMS are all located within a 1 mile radius and thereby define a nodal area; wherein the predictive information is specific to the nodal area; wherein the predictive information is specific to the nodal area; and, wherein one or more of the mobile devices is associated with the nodal area; wherein the predictive information is specific to the nodal area; wherein one or more of the mobile devices is associated with the nodal area; and wherein the nodal area specific predictive information is communicated to the mobile devices associated with the nodal area; wherein the predictive information is specific to the nodal area and is communicated to mobile devices associated with the nodal area; wherein the predictive information is specific to the nodal area; and wherein the specific predictive information comprises a notice to activate the EFMS, and the activation notice appears on a mobile unit associated with the nodal area; wherein the predictive information is specific to the nodal area; and wherein the specific predictive information comprises a notice to activate the EFMS; and wherein the EFMS is automatically activated by the system; wherein at least one of the mobile units is configured for, and thereby in, direct communication with one or more predetermined unit, thereby defining a group; wherein at least one of the mobile units is configured for, and thereby in, direct communication with one or more predetermined unit, thereby defining a group; and wherein the group is associated with a nodal area; wherein at least one of the mobile units is configured for, and thereby in, direct communication with one or more predetermined unit, thereby defining a group; and wherein the group is associated with a nodal area, wherein the nodal area comprises an EMFS as a unit; wherein at least one of the mobile units is configured for, and thereby in, direct communication with one or more predetermined unit; thereby defining a unit to unit communication pathway; and wherein at least one of the mobile units is configured for, and thereby in, direct communication with one or more predetermined unit; thereby defining a unit to unit communication pathway; wherein the unit to unit communication pathway is private.

Yet further, there is provided these systems and methods having one or more of the following features: wherein at least one of the mobile units is configured for, and thereby in, direct communication with one or more predetermined unit; thereby defining a unit to unit communication pathway; wherein the unit to unit communication pathway is private; and wherein the unit to unit communication pathway includes a nodal area, a predetermined group, or both; wherein at least one of the mobile units comprises a GUI configure to display at least one of the functionalities: a fire locations; I see fire; fire; heavy smoke; embers; fire danger; no fires in area; smoke in area; fire in area; fire nearby; track a wildfire; hotspots; wherein at least one of the mobile units comprises a GUI configure to display at least one of the functionalities: emergency management alert; fire department alert; wildfire distance alert; and fire emergency checklist; and, wherein at least one of the mobile units comprises a GUI configure to display at least one of the functionalities: EFMS status; EFMS system ready; EFMS sprinklers; activate systems; fire department alert; wildfire distance alert; and fire emergency checklist.

In addition, these systems and methods having one or more of the following features: wherein the information or data comprises one or more of a location of a fire, a location of smoke, a location of embers, a direction of movement of a fire, and an evacuation route; wherein the fixed units comprise a GUI; wherein at least one of the plurality of mobile units comprises a unit selected from the group consisting of a cell phone, a smart phone, a tablet, a lap top computer, a vehicle navigation system; having at least ten EFMS; having at least ten EFMS all located within a 10 mile radius, and thereby define a nodal area; having at least ten EFMS all located within a 5 mile radius and thereby define a nodal area; having at least five EFMS all located within a 1 mile radius and thereby define a nodal area; wherein at least some of the information, data or both is specific to the nodal area; wherein at least some of the information, data or both is specific to the nodal area; and, wherein one or more of the mobile devices is associated with the nodal area;

wherein the information, data or both is specific to the nodal area; wherein one or more of the mobile devices is associated with the nodal area; and wherein the nodal area specific information, data or both is communicated to the mobile devices associated with the nodal area; wherein the information, data or both is specific to the nodal area and is communicated to mobile devices associated with the nodal area; wherein the information, data or both is specific to the nodal area; and wherein the specific information, data or both comprises a notice to activate the EFMS, and the activation notice appears on a mobile unit associated with the nodal area; wherein the predictive information, data or both is specific to the nodal area; and wherein the EFMS is automatically activated by the system; wherein at least one of the mobile units is configured for, and thereby in, direct communication with one or more predetermined unit, thereby defining a group; and, wherein at least one of the mobile units is configured for, and thereby in, direct communication with one or more predetermined unit, thereby defining a group; and wherein the group is associated with a nodal area.

Furthermore, there is provided these systems and methods having one or more of the following features: wherein the mobile unit is configure so that raw data is inputted by a user of the mobile unit; wherein the raw data is automatically obtained from a sensor associated with the mobile unit; wherein the data processing assembly is configured to provide predictive information to one or more of the first mobile device, the second mobile device and the EFMS; wherein the predictive information is an activation command provided to the EFMS; wherein the predictive information is an activation of the EFMS provided to the second mobile device; wherein the predictive information is based in part upon raw data from the network; wherein a node of the system is a fixed unit associated with an emergency management HQ; and wherein a node of the system is associated with a system for providing, managing or both insurance claims.

Moreover, there is provided these systems and methods having one or more of the following features: wherein the network is a pier to pier network having a plurality of EFMS control systems in direct communication with each other, using a communication protocol; wherein the network is a pier to pier network having a plurality of EFMS control systems in direct communication with each other, using a communication protocol, wherein the protocol does not require the internet; wherein the network is a pier to pier network having a plurality of EFMS control systems, having a local controller, in direct communication with each other, using a communication protocol, wherein the protocol LoRa; and wherein the network is a LoRaWAN® network architecture having a plurality of EFMS controllers in direct communication with each other, using a communication protocol, wherein the protocol LoRa.

DESCRIPTION OF THE PREFERRED EMBODIMENTS

The present inventions relate to networks, systems and the providing of derived data, predictive information, and adaptive strategies for use in multivariable component systems and activities, and in particular, for use in wildfire mitigation, management and suppression, including wildfire emergency response management. In particular, the present inventions relate to systems, networks and methods that provide derived data, predictive data, adaptive strategies, virtual data and combinations and variations of these, for multivariable component systems, such as for use in wildfire mitigation and management and suppression, including wildfire emergency response management.

More particularly, in embodiments, the present inventions relate to systems equipment and networks for the monitoring and collecting of raw data regarding wildfire responses, real time, historic and both. This raw data is then analyzed to provide derived data, predictive data, adaptive strategies, virtual data, and combinations and variations of this data, which depending upon the nature of this data may be packaged, distributed, displayed and used in various settings and applications.

The present inventions include the disclosure set forth in Appendix A, the entire disclosure of which is incorporated herein by reference, and becomes a part of this Specification. The present EMFS and communication systems provide, among other things, the hydration levels and operations set forth in Appendix A.

Figure 1A:
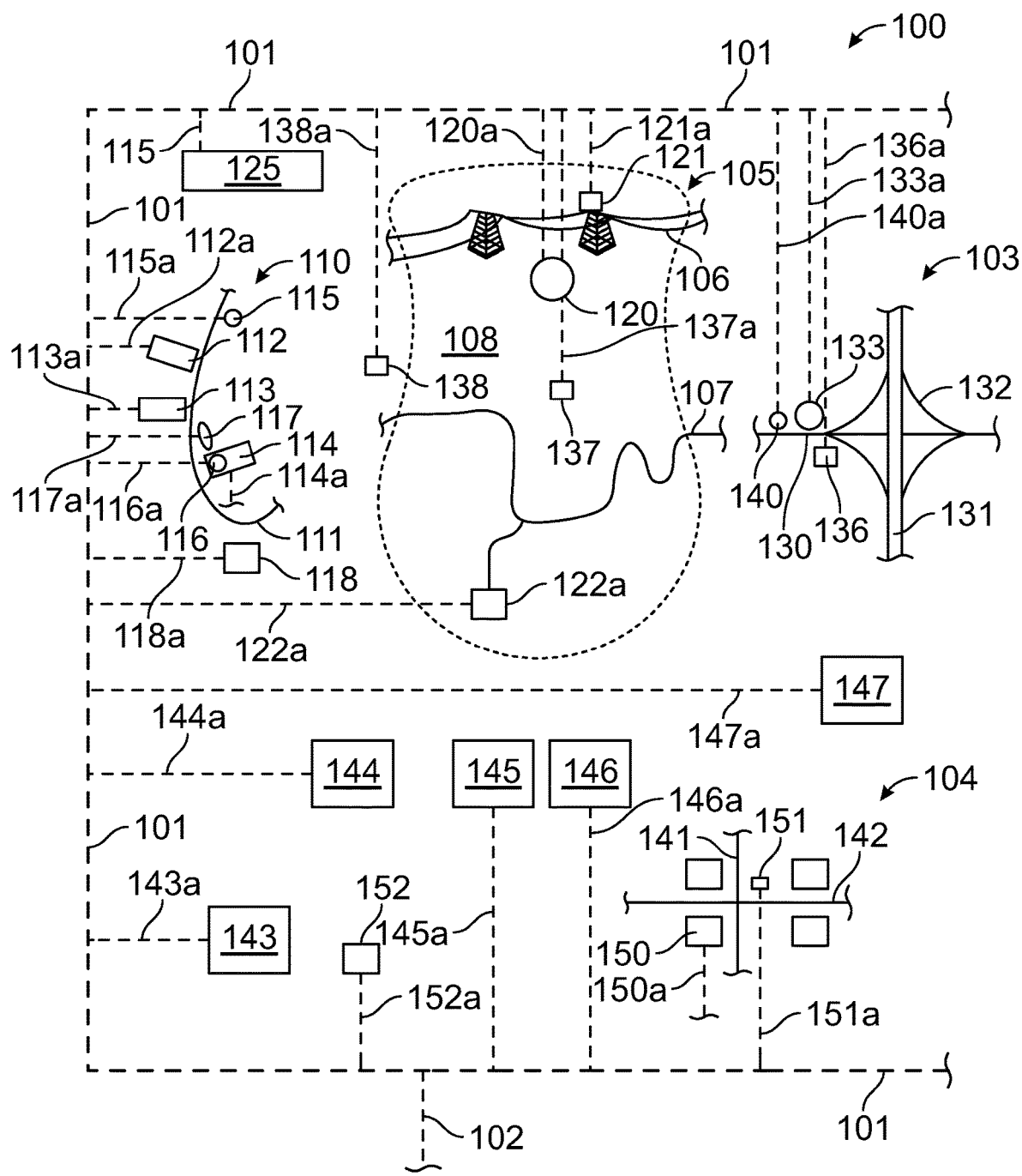
FIG. 1A is a schematic of an embodiment of an emergency communications system in accordance with the present inventions.
Figure 1B:
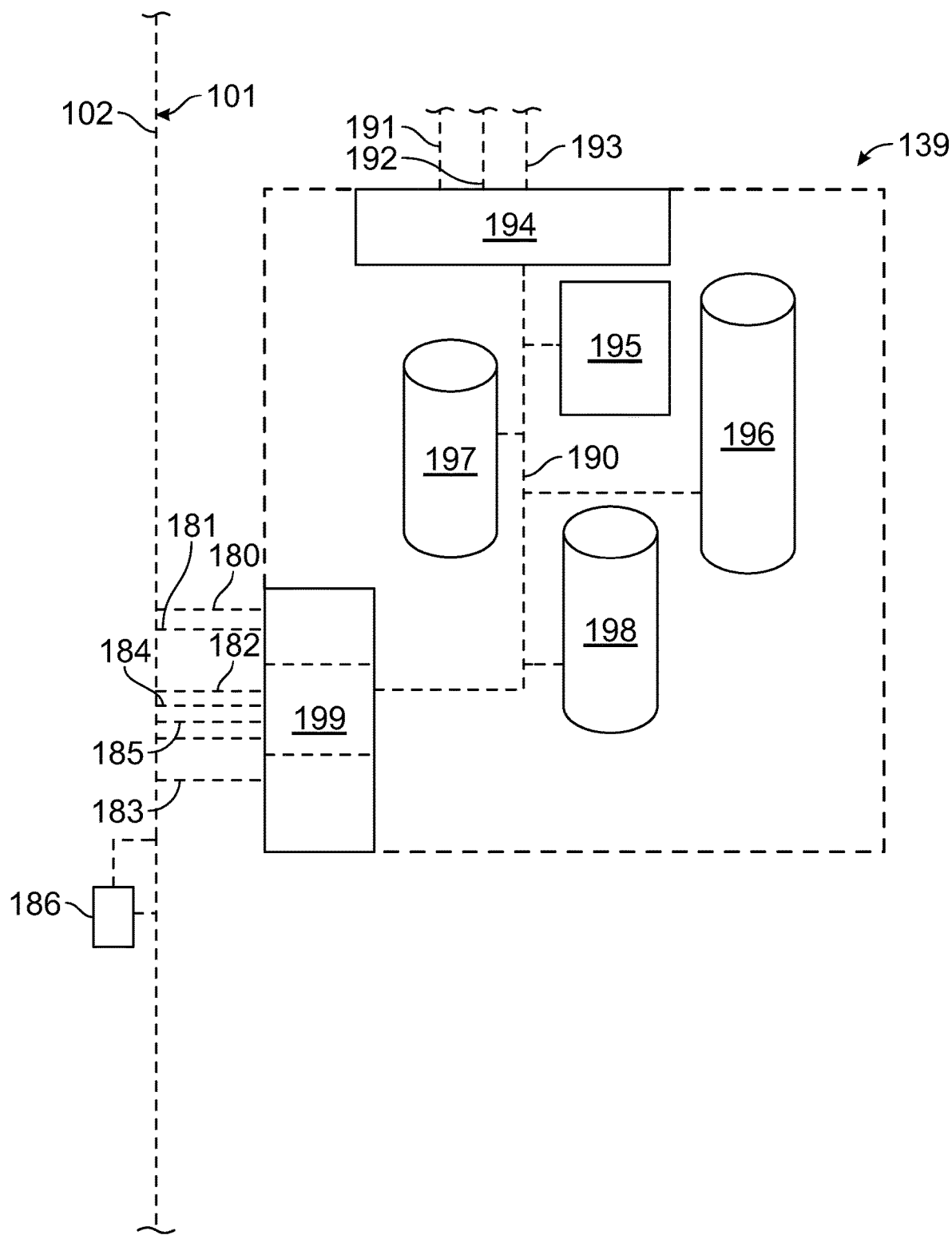
FIG. 1B is a detailed schematic of an embodiment of a data processing assembly of the system of FIG. 1, in accordance with the present inventions.

Turning to FIGS. 1A and 1B, there is provided an embodiment of a fire emergency communication system for a community. The communication system 100, has a network 101. The network 101 may be any type or combination of types of communication and data networks. Thus, for example, the network 101 can be a distributed network, a direct communication network, a control network, the internet, the world wide web, a wireless network, a cellular network, a Wi-Fi network, a hard wired network, an Ethernet network, a satellite network and combinations and variations of these, and other data and information communicate equipment and process that are presently known and may become known in the future.

The fire emergency communication system 100 has several nodes or communication points, each node or communication point having one or more receiving device, monitoring device, transmitting device and combinations and variations of these. There is a node 110 that is associated with a residential area, e.g., a nodal area. There is a node 105 that is associated with a rural area, e.g., a nodal area. There is a node 103 that is associated with an area having access to a limited access highway, e.g., an intersection nodal area. There is a node 104 that is associated with an urban area, e.g., an urban nodal area. Each of these nodes, also has a number of individual nodes within, or associated with them. The individual nodes within a node, form a nodal area, nodes that are mobile can move from one nodal area to another nodal area.

It is understood, that one, tens, and hundreds of nodal areas, each having one, tens and hundreds of nodes, can be associated with the communication system 100, and network 101. Moreover, multiple networks, such as network 101, can be associated with, or a part of, the communication system 100.

The number and types of nodal areas may vary, from situation to situation, community to community, from public services team/organization to public services team/organization and may vary before, during and after a wildfire.

The number and types of individual nodes, in any given nodal area, may vary, from situation to situation, community to community, from public services team/organization to public services team/organization and may vary before, during and after a wildfire.

In the embodiment of FIG. 1A, the network 101 of fire emergency communication system 100 has as individual nodes: dwelling (house, apartment building, condo building, hotel) 112, dwelling (house, apartment building, condo building, hotel) 114, mobile device (cell phone, On-star, apple watch, etc.) 115, mobile device (cell phone, On-star, apple watch, etc.) 116, First Responder (police, Ambulance, EMS (emergency medical services), Red Cross, National Guard, etc.) 117, school 118, first responder unit 120, fixed location monitoring station, data collection and transmission device (positioned on, e.g., cell town, power line pole, etc.) 121, dwelling (e.g., ranch, etc.) 122, airport 125, first responder 133, fixed location monitoring station, data collection and transmission device (positioned, e.g., on a traffic light, associated with a traffic camera, etc.) 136, cell tower (fixed data collection and transmission device) 137, monitoring station, fixed data collection and transmission device 138, mobile device (cell phone, On-star, apple watch, etc.) 140, Emergency Management (head quarter, command center, etc.) 143, police department 144, fire department 145, Ambulance 146, Hospital 147, business (office, retail shop, restaurant, manufacturing, etc.) 150, traffic camera/red light camera (fixed data collection and transmission device) 151, and fixed data collection and transmission device (e.g., positioned on or with a cell tower 152).

Further these nodes may be viewed as sub-nodes of a larger node. For example fire emergency communication system 101 could be included as a sub-node in a larger communication network, having one, tens, hundreds of similar fire emergency communications systems.

The individual nodes typically and preferably have GUI. They may have associated keyboards, key pads, touch screens, voice control, etc., and combinations and variations of these. The GUI have displays that among other things have graphics for providing information about traffic, fire location, evacuation, evacuation routes, location of gas stations, location of first responders, as well as, the ability to have user input of real time data, e.g., user location, presence of ambers, visibility, proximity to fire, traffic conditions. Preferably, icons, windows or screens are provided on the GUI by an application (app) that is loaded onto a mobile device, such as a smart phone, tablet or vehicle GPS/navigation system. The GUI may also be configured to provide real time, historic, derived, predictive, and virtual data. The GUI may be configured to have private access on the then network to another node on the network. For example, mobile device 140 may have a private communications path with dwelling 112, enabling mobile device to display real time raw data (e.g., images, temperature) of the conditions around dwelling 112 and send instruction to dwelling 112. For example, to activate a fire suppression system for dwelling 112. The monitoring unit of dwelling 112 may also have a processor, or be in communication (control communication) with the processing system to automatically activate the fire suppression system for dwelling 112, sent notifications to mobile device 140 recommending activation of the fire suppression system for dwelling 112, as well as, sending notice that the fire suppression system has been activated. The notices may also be broadcast over the entire network, only to the area where the node or dwelling is located, only to first responders (e.g., emergency services, fire, police, ambulance etc.) and combinations and variations of these.

The network 101, has several communication pathways. These pathways may be over the same routes, or portions of the network 101, they may share some but not all routes, they may be totally separate, and combinations and variations of these. Each route or pathway may have its own proprietary communication protocol, it may use a publicly available protocol. The protocols may include, but are not limited to CoAP, MQTT, AMQP, WAMP, LoRAWAN, LoRa, IPv4, or IPv6. The communication, e.g., the data and information set over the pathway may be encrypted, protected, or otherwise encoded, such that only an intended recipient can receive it, for example a predetermined recipient, e.g., an individual who has taken the necessary steps to rightfully receive information and data from the data processing assembly 139.

Each individual node preferably has the ability to receive and transmit data and information. However, a node only needs the ability to receive or transmit data or information. For example, in some embodiments of monitoring stations they may only transmit data and information.

Turning to the residential area 110, there is shown a schematic representation of an example of a residential area. (The residential area may be a part of, adjacent or far removed from the other areas in the system.) The residential area 110 has street 111. The various node in this area each have communication pathways: dwelling 112 has communication pathway 112*a*, mobile device 115 has communication pathway 115*a*, mobile device 116 (which is in dwelling 114) has communication pathway 116*a*, first responder 117 has communication pathway 117*a*, school 118 has communication pathway 118*a*. In addition, dwelling 114 has a private security system that has a communication pathway 114*a* to a private security provider. As discussed below, such nodes, e.g., 114, can be brought into the system 100, by the private security provider feeding, i.e., providing or transmitting, data and information from its network or customers to the processing system 139.

Turning to the rural area 105, there is shown a schematic representation of an example of a rural area. (The rural area may be a part of, adjacent or far removed from the other areas in the system.) The rural area 110 has winding, narrow country road 107, a large area 108 (shown by dotted line) that contains significant fuel sources for a wildfire, and power lines 106. The various nodes in this area each have communication pathways: first responder unit 120 has communication pathway 120*a*, monitoring station 121 has communication pathway 121*a*, dwelling 122 has communication pathway 122*a*, cell tower fixed data collection and transmission device 137 has communication pathway 137*a*, and monitoring station 138 has communication pathway 138*a*. And, airport 125, which is adjacent to residential area 110 and rural area 105 has communication pathway 125*a*, Turning to the limited access highway area 103, there is shown a schematic representation of an example of a limited access highway and its surroundings. (The limited access highway area may be a part of, adjacent or far removed from the other areas in the system.) The limited access highway area 103 has a multilane limited access highway 131 having multiple on and off ramps, e.g., 132, and a street 130. The various nodes in this area each have communication pathways: monitoring station 136 has communication pathway 136*a*, mobile device 140 has communication pathway 140*a*, and first responder 133 has communication pathway 133*a*.

Turning to the urban area 104, there is shown a schematic representation of an example of an urban area. (The urban area may be a part of, adjacent or far removed from the other areas in the system.) The urban area 104 has a street 141 that intersects street 142. The various nodes in this area each have communication pathways: traffic camera/red light camera 151 has communication pathway 151*a*. And a fixed data collection and transmission device (e.g., positioned on or with a cell tower 152) adjacent to the urban area 104, has communication pathway 152*a*. In addition, business 150 has a private security system that has a communication pathway 150*a* to a private security provider. As discussed below, such nodes, e.g., 150, can be brought into the system 100, by the private security provider feeding, i.e., providing or transmitting, data and information from its network or customers to the processing system 139.

Emergency Management (head quarter, command center, etc.) 143, has communication pathway 143*a*, police department 144 has communication pathway 144*a*, fire department 145 has communication pathway 145*a*, ambulance service 146 has communication pathway 146*a*, and hospital 147 has communication pathway 147*a*.

The network 101 has pathway 102 that connects the network to processing system 139 (as shown in greater detail in FIG. 1B). Here one path way is shown, it being understood that multiple pathways to the processing system 139, multiple processing systems and combinations and variations of these can be used.

The network 100 can have multiple private pathways. For example, a dwelling can have an external fire protection system that has a control system, sensors, actuators and communication pathway. This external fire protection system has a private communication pathway with processing system 139, as well as, with one or more mobile devices that also connect to processing system 139 and directly or through the processing system to the control system of the dwelling's fire protection system. There may be tens, hundreds or more of these private pathways. As the processing system 139 receives more data and information it can determine if recommendations to start a particular dwelling's fire protection system should be sent, or if the command to start the system should be sent. This can also be done on an area by area basis.

Thus, for example, the processing system 139 is receiving real time raw data from multiple nodes in the network that provide real time information about, for example traffic patterns, location of fire, speed of fire, direction of movement of the fire, wind speed and direction, humidity, number and location of persons, location of first responders. The processing system 139 also has access to historic data, such as prior weather, prior fire patterns, prior traffic patterns, surveys of fuel sources for the fire, and geographic terrain. The processing system using the real time raw data, and preferably, but not necessarily, the historic data can provide derived data about fire movement, traffic patterns, resource allocation, preferably this derived data can be predictive data. Different forms, and types of this derived data and predictive data can then be transmitted out onto the network to different nodes. For example, the information a mobile device may receive could be limited to the status of a fire suppressions system linked to that device, the proximity of the fire, the predicted path of the fire, traffic and suggested evacuation routes. The information provided to first responders and emergency management HQ could be far more extensive. For example, historic data about the number of dwellings having external fire suppression systems in a particular area, the fuel sources in that area, coupled with real time raw data about the number of people in that area, could be used to determine the placement of first responders, and the need for evacuations.

Nodes, nodal areas, individual nodes may be organized and configured into various sub-nodes. These sub-nodes can be private or semi-private or public. For example, a company could have a private sub-node for its employees, and within that a sub-node for its fleet of vehicles. Similarly, a school could have a sub-node for its children and parents. A sub-node could include all of the nodes that are external fire management systems, and then have sub-nodes for particular types of system, e.g., by provider, level of services, etc.

Turning to FIG. 1B, there is shown a schematic of an embodiment of a data processing system or assembly 139.

The data processing system 139 has a network 190 that provides communication pathways to the components of the data processing system 139. The data processing system has a network 190 for transferring information and data between the various components. Incoming information, from pathways 191, 192, 193, is received by unit 194. Pathways 191, 192 and 193 are other sources of raw data, historic data and even predictive and derived data. Processor 195, which may be a computer, has the algorithms and programs to provide the derived data and predictive information, as well as, provide adaptive responsive strategies. Processor 195 also preferably controls the network traffic with and between storage devices 196, 197,198 and unit 199. Unit 199 is for sending and receiving information to and from the network 101. It should be understood that system 139 may itself be distributed over a network, or reside on the cloud. Unit 194 and 199 may be the same unit, or they may be multiple separate or distributed units, and combinations and variations of these.

Unit 199 receives and provides information, data and control communication to and from the data processing system 190 to the network 101. Data to individuals is sent along pathways 180 for standard data and content, and along path 181 for premium data and content. For example, standard data may show only public service announcements and other official information from the authorities. Premium data, can show predicted fire movement, number and location of external fire management systems (and their status over time).

Both of these individual data streams, sets or packets, e.g., data for individuals, travels along pathway 102 of network 101. This data for individuals travels along pathway 102 to a smart phone, tablet, such as an iPad®, a GUI in an automobile (dash display), or other GUI, where one or more of raw data, derived data, adaptive strategy information and predictive data are presented on the display. Thus, for example, data may travel along pathway 181 to pathway 102 to one or more individual pathways (e.g., 113a) or to a nodal area, e.g., 110, or the entire network. The data is then displayed on the GUI associated with the node (e.g., 113) and information may be input into the GUI and then transmitted along the individual pathway to the network pathway 102, to a pathway, e.g., 181.

The other pathways from unit 199, e.g., pathway 182, 184, 186, etc., are for other custom or special communication or sub-networks. Thus, by way of example, pathway 182 can be for controlled communication for external fire management systems. Realtime raw data, derived data, adaptive strategy information and predictive data may be sent to a user's mobile node, a fixed node on the external fire management system and both. The user can then monitor the information and elect to send a command to the external fire management system to, for example, become read, to operate, or to operate upon a certain set of conditions. The system 139 can send predictive data, e.g., recommending that the external fire management system is activated. The system 139 can also send information, data, or a command to one or more external fire management systems that cause the system(s) to operate.

In this manner the system 139 can provide derived data and adaptive strategies, to individuals and entire areas, in a direct response to changing fire conditions. This provides the ability to save fire suppression resources (i.e., water, foam) until they are absolutely needed, to use them in the most efficient manner, both on a micro level (each individual system, or structure) and on a macho level, (most efficient use of systems, and activation/operation strategy to protect an area).

By way of example, pathway 184 can be non-public and exclusive to fire response teams. Pathway 185 can be non-pubic and exclusive to all first responders. Pathway 183 is for communication with network television and social media. This pathway allows specified data and information from the system 139 to be broadcast to a GUI 186, e.g., a TV or computer monitor, on public networks and social medial.

Generally, the sources for incoming raw data for use in, or to form a basis for, the algorithms and mathematical computations that a processor performs to provide derived data and predictive information and adaptive strategies, can come from various sources, including for example: individual mobile devices (e.g., input from persons, first responders, emergency services, satellites), fixed monitoring devices (e.g., cell tower mounted devices, external fire suppression system, fire services, weather services, traffic monitors, first responders, emergency services, etc.).

Because of the complexity and unpredictability of wild fires, fire emergency and the reactions of persons, although a single approach may be used, in an embodiment a multi-approach system approach is used, the multi-approach having two, three, four or more approaches performed at the same time to determine a set of approach values for a given event at a given point in the fire emergency. These approach values, e.g., probability of event occurring, are then given weightings based upon their individual accuracy for a particular point in the fire emergency, e.g., rural fire, fire size, population levels, population density in relation to ingress and egress routes, start (activation) of an external fire management system, number of EFMSs in a location, etc. The weighted approach values are then combined to provide a predicted value, i.e, derived data of a predictive nature, such as for example an adaptive strategy, a recommendation to activate a particular EFMS, a warning to evacuate, etc.

Figure 2:
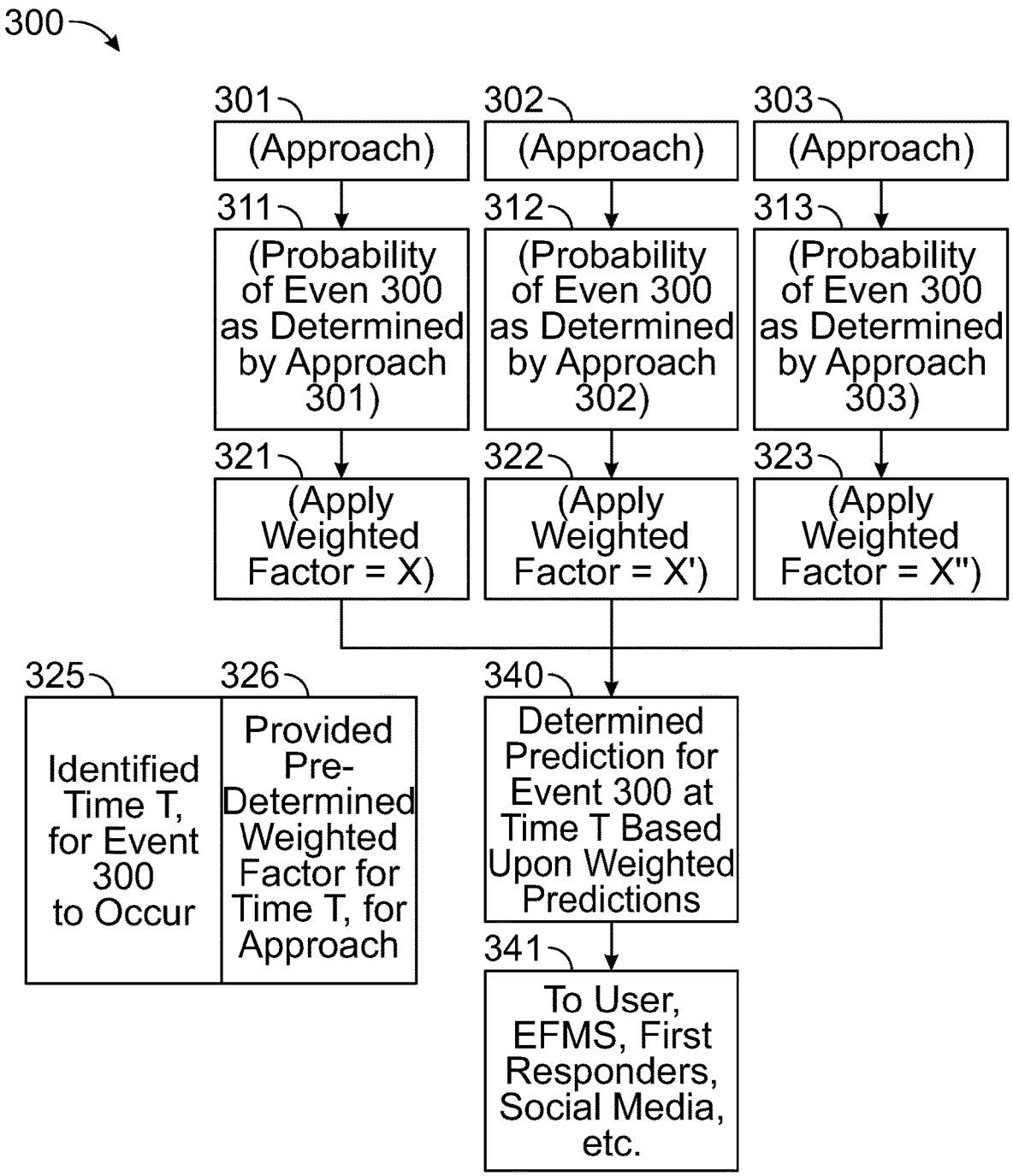
FIG. 2 is a flow chart of an embodiment of approaches and a method to obtain predictive data in accordance with the present inventions.

Turning to FIG. 2, there is shown a flow chart of an embodiment of a method of using a three-approach system 390 to provide derived data that is predictive of an event 300, e.g., fire reaching location A at time T. A mathematical approach 301 looks at real time raw data and historic derived data and determines a probability 301 for event 300 to occur. Another mathematical approach 302, uses calculations different from approach 301, and looks to real time raw and derived data and determines a probability 312 for event 300 to occur. Another approach 303, which may be the same mathematical approach as approach 301 or approach 302, or may be different from both, looks to other data, not relied upon in approaches 302, 303 and provides a probability 313 for event 300 to occur.

The time T, 325, or provided 326) when the prediction of even 300 is possible to occur is then selected by an individual, e.g., emergence services person, home owner, school principal, etc.

Weighting factors X, X', X" based upon T are then applied to the predicted values 311, 312, 313 to render weighted predicted values 321, 322, 323. Preferably the weighting facts are predetermined 326 for each value of T, or they may be determined based upon predetermined parameters at the time of use. The weight values can be any integer, or fraction. The weighted predictive values 321, 322, 323 are then combined to provide a predicted value 340 for event 300 at time Z, e.g., 80% chance that fire reaches "Shady Acers" in the next 90 minutes. The resulting predicted value 340 is then transmitted to, accessible by and combinations and variations of these a network (e.g, 101) of fire emergency communication system (e.g., 100)

Figure 3:
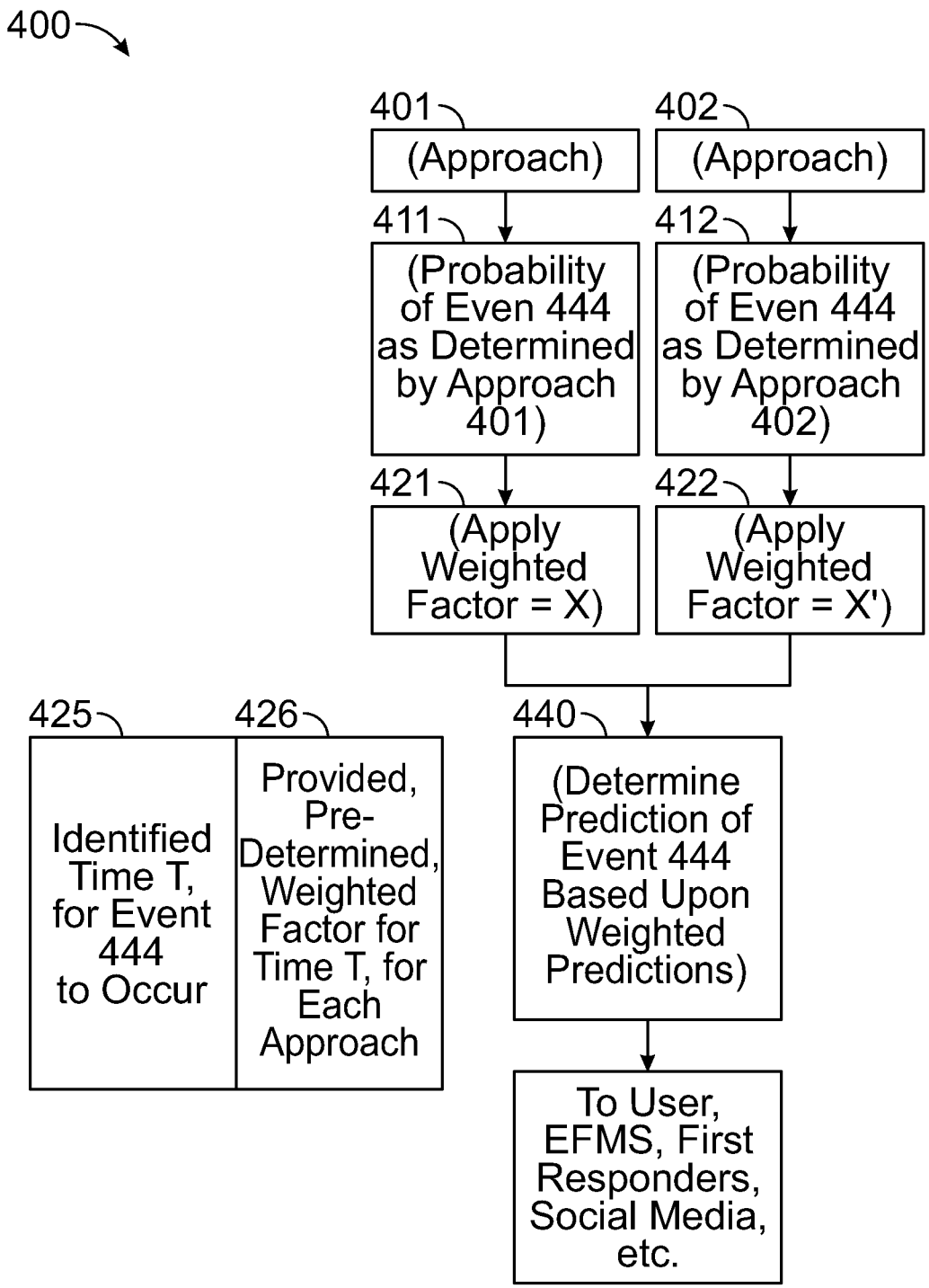
FIG. 3 is a flow chart of an embodiment of approaches and a method to obtain predictive data in accordance with the present inventions.

Turning to FIG. 3, there is provided a flow chart for an embodiment of a two-approach system 400. A statistical approach 401 and a deterministic model approach 402 are used.

The statistical approach 401 uses real time raw data, real time derived data and historical derived data in an appropriate probability distribution, such as a gamma probability distribution, beta-binomial probability distribution, standard normal probability distribution, beta probably distributions, or the Dirichlet probability distribution. Thus, for example approach 401 can use current fire position, current humidity, current wind speed, and current wind direction, to project the probability of the fire reaching location A, over a period of time ΔT into the future.

The time T, 425, when the prediction of even 444 is possible to occur is then selected by an individual, e.g., emergence services person, home owner, school principal, etc.

Weighting factors X, X', X" based upon T are then applied to the predicted values 411, 412, to render weighted predicted values 421, 422. Preferably the weighting facts are predetermined 426 or each value of T, or they may be determined based upon predetermined parameters at the time of use. The weight values can be any integer, or fraction. The weighted predictive values 421, 422 are then combined to provide a predicted value 440 for event 444 at time Z, e.g., 80% chance that fire reaches "Shady Acers" in the next 90 minutes. The resulting predicted value 440 is then transmitted to, accessible by and combinations and variations of these, a network (e.g, 101) of fire emergency communication system (e.g., 100)

Figure 3A:
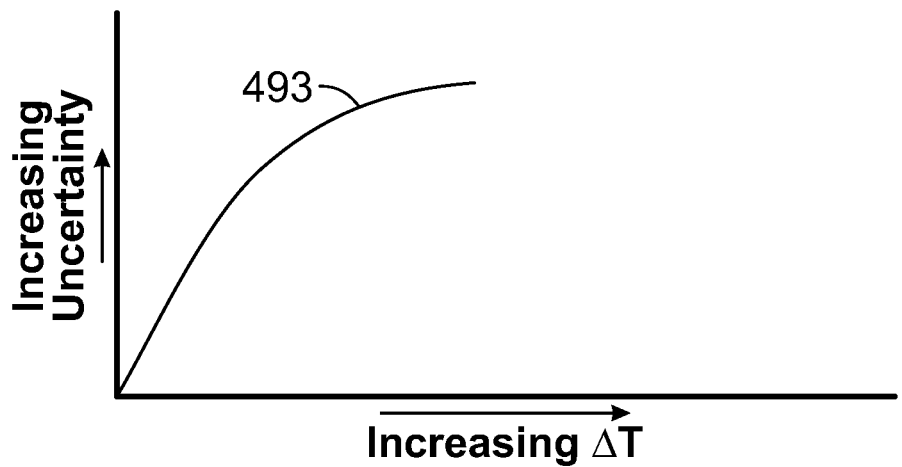
FIG. 3A is a graph of an embodiment of uncertainty of an event over time in accordance with the present inventions.
Figure 3B:
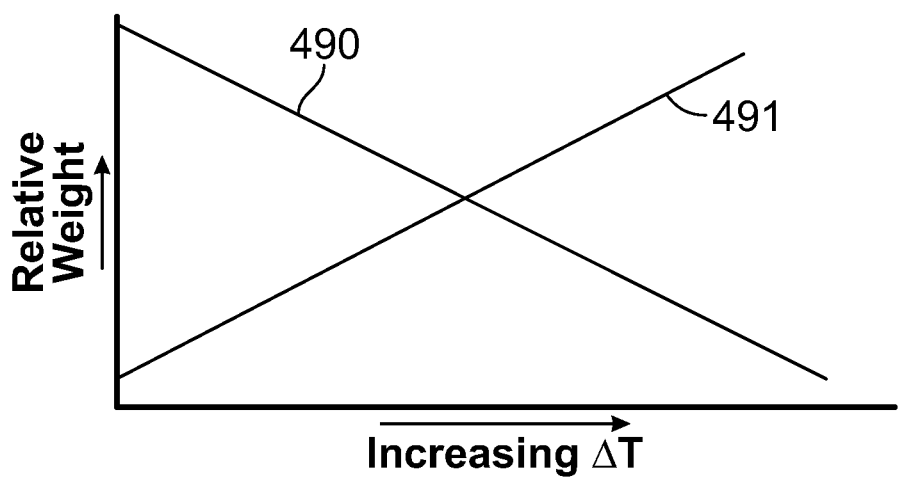
FIG. 3B is a graph of the relative weight to be given different predictive information based upon the source of that predictive information over time in accordance with the present inventions.

As ΔT becomes larger the uncertainty around probability value 411 increases. Thus, FIG. 3A shows a curve 493 of future uncertainty vs increasing ΔT. Similarly as ΔT increases, e.g., one is looking to predict further out into the future, the certainty, and thus the relative weight for certain data used in the approach change. Thus, as shown in FIG. 3B, the relative weight of the current fire position 490 decreases as the prediction is further out in time; while the relative weight of the historic trend data 491 increase when the point for the prediction is further out as time, e.g., increasing ΔT The deterministic model approach 402 has higher certainty in predicting events that are not as far out into the future, i.e., smaller ΔT values. In particular the deterministic model approach 402 has greater certainty of its values as larger amount of data are acquired from the fire emergency.

Other forms of derived data use generalized machine learning algorithms such as Support Vector Machines to predict or classify fire emergency events. These predictions or classifications are forms of derived data. One possible prediction is the probability that a fire will jump a highway or natural barrier. Support Vector Machines may be trained on historical data to create a classifier that can predict the probability that fire will behave in a certain manner.

Inferential techniques can be used to determine traffic patterns and availability of ingress and egress routes. These techniques would take as input raw data and/or other pieces of derived data. Inference could be performed, for example, via use of heuristics based on traffic pattern knowledge, real time traffic information from waze, google maps etc., or statistical techniques for pattern recognition.

In some uses, derived and predictive data and virtual data are displayed to users through a client, e.g. a web browser. These data are sent to the client from a server, or from other clients. In some situations, the client will request new data constantly because it is difficult to know if a particular piece of data has been updated. Preferably, the client and/or server is able to determine which data are likely to have changed at a point in time, and therefore prioritize the communication of data that are likely to have changed. This scheme decreases unneeded communication between clients or between clients and servers. The server may determine that particular data are likely to have changed and push that data to the client, or the client may determine that particular data are likely to have changed and request those data from another client or a server.

EXAMPLES

The following examples are provided to illustrate various embodiments of systems, devices, methods, and uses and displays of derived, predictive "adaptative strategies and virtual data. These examples are for illustrative purposes, may be prophetic, and should not be view as, and do not otherwise limit the scope of the present inventions.

Example 1

Figure 4:
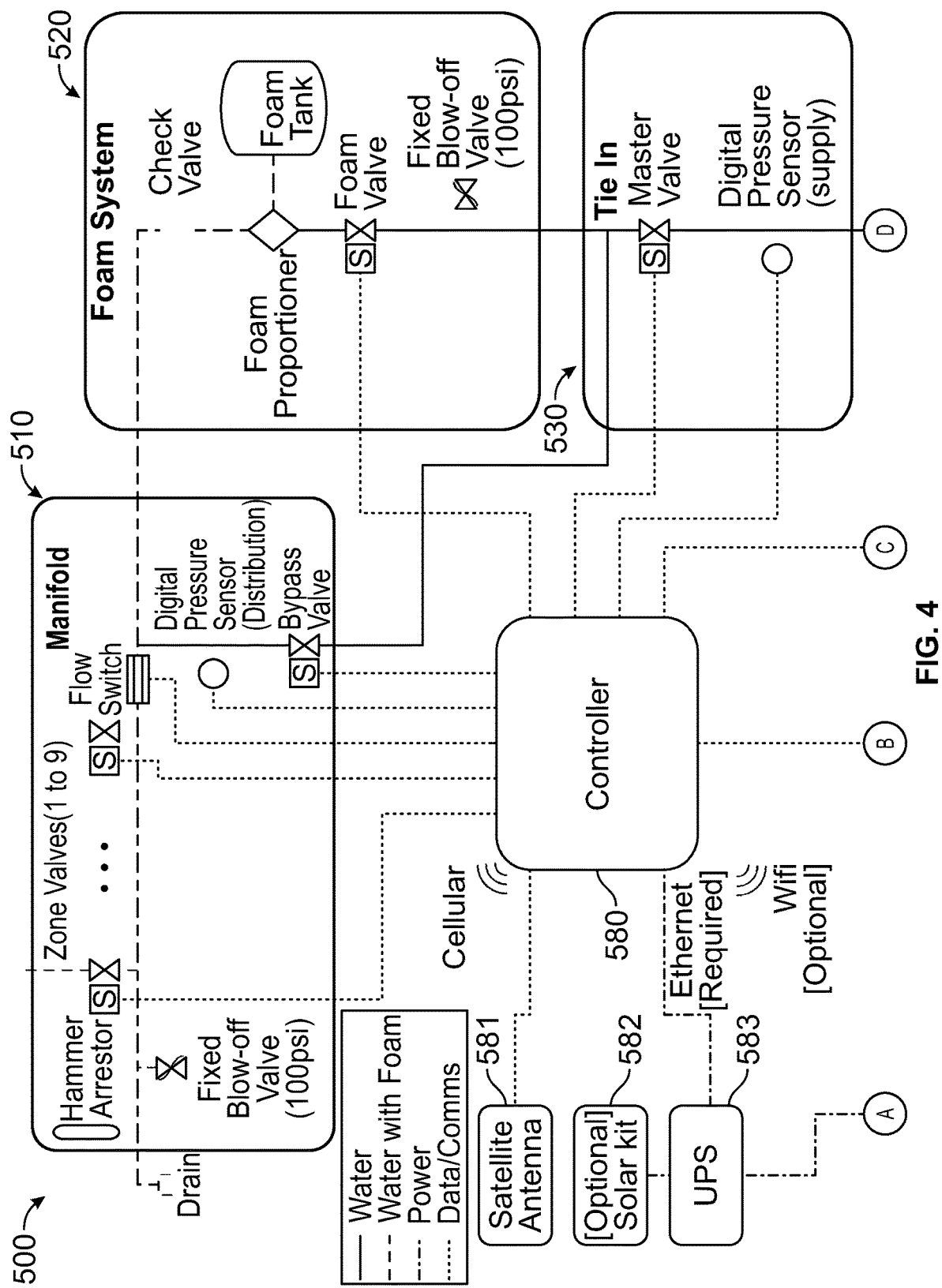
FIG. 4 is a schematic of an embodiment of a EFMS in accordance with the present inventions, which can form a node on an embodiment of an emergency communications system in accordance with the present inventions.
Figure 4:
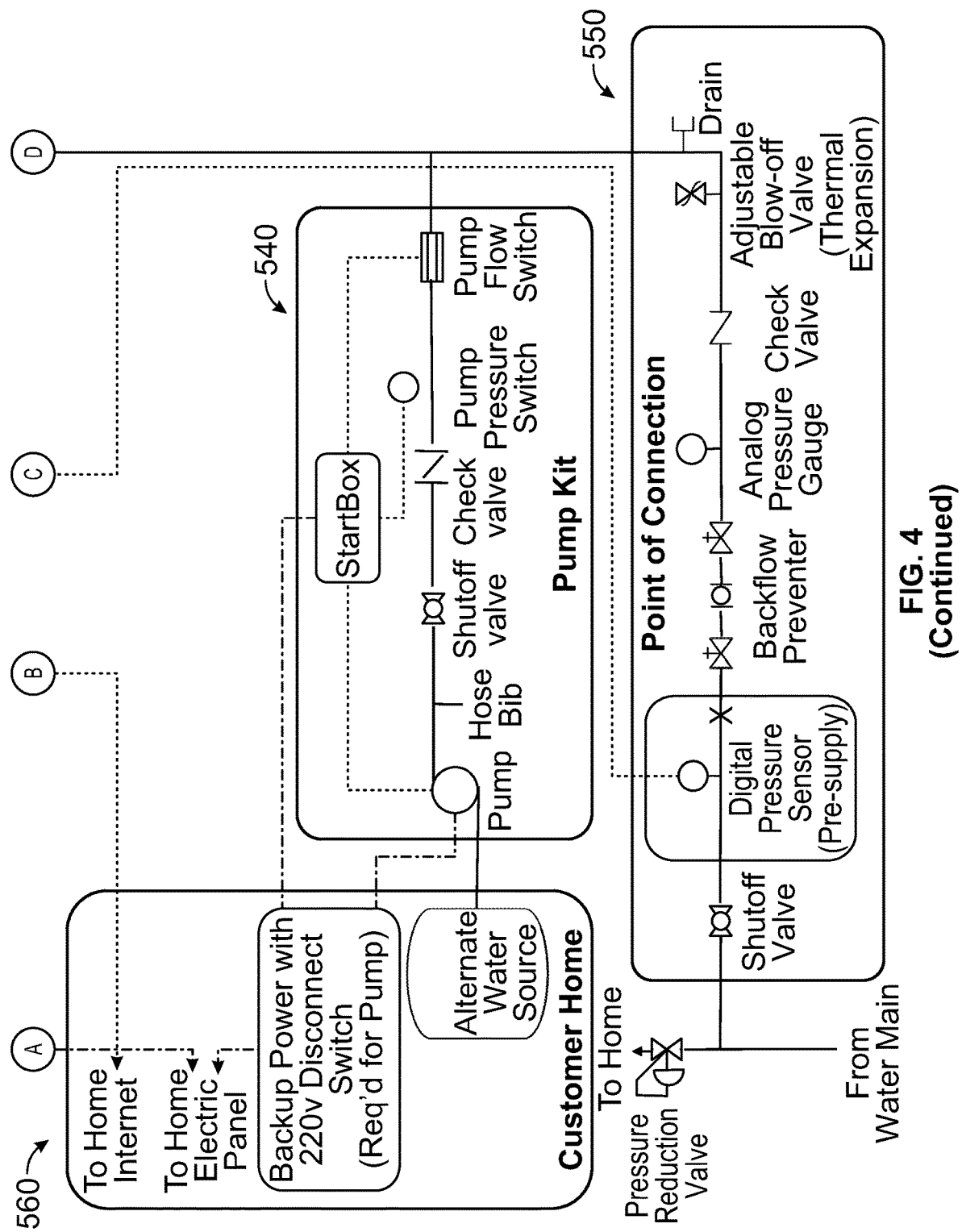

FIG. 4 is a schematic of an embodiment of a EFMS 500. The controller 580 is connected to the network of a fire emergency communications system by one of two or both path ways, i.e., cellular and WiFi to home internet. One, two, ten or more structures in an area can have these EFMS 500. The EFMS can include a manifold 510, a foam system 520, a tie in 530, a pump kit 540, a point of connection 550, a satellite antenna 581, an solar kit 482, and a UPS (universal power supply). These components are associated with a structure (e.g., a house) 560.

Example 2

The EFMS and devices of US Patent Publication 2019/0262637, the entire disclosure of which is incorporated herein by reference, form a node or nodes on the fire emergency communications system. One, two, ten or more structures in an area can have these EFMS.

Example 3

An emergency management control network and system, e.g., the embodiment of FIG. 1, one, two, five, tens, hundreds and more EFMS that are on the emergency management control network and system. The network can have EFMS the configure of the embodiment of FIGS. 4, 11, as well as other configurations. The data processing assembly (e.g., 139), based upon raw data received from various nodes on the network, processes that raw data to provide predictive information about the location and movement of a wildfire. The predictive information is communicated over the network. The predictive information can be a control command to a particular EFMS system, such as to arm, to operate, and to stop operations. This control command information can be sent to a group of EFMS in a nodal area, e.g., a predetermined nodal area.

Example 4

Figure 5:
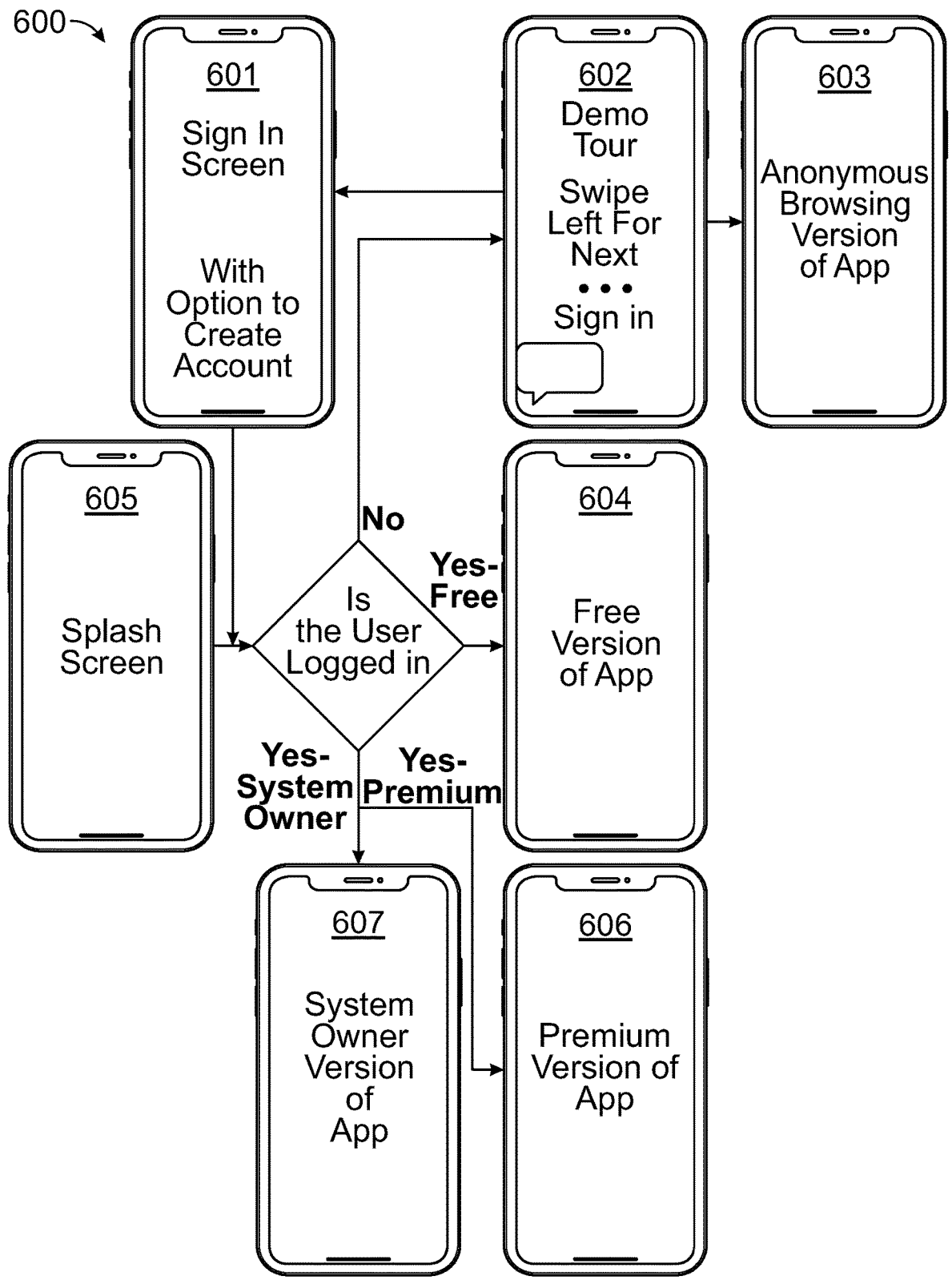
FIG. 5 is a schematic of an embodiment of operations, log in, and options for units that are nodes on an embodiment of a network system in accordance with the present inventions.

Turning to FIG. 5. there is shown a schematic flow diagram 600 of operations for the log in of a unit having a GUI, (e.g., a smart phone, tablet, computer, watch, etc.) as a node on the network and the various options of information, data and communication (e.g., control communication) that are available for the unit. Thus, there is a splash screen 605 for GUI. From screen 605 the system determines if the user is logged in. If the user is not logged in the user is then sent to, e.g., shown, screen 602 which is a demo or demonstration screen 605. From the demonstration screen 602 there are two options. The user can be sent to the sign in screen 601, or the user can be sent to screen 603, where the user can view, experience the demonstration, e.g., anonymous browsing of the application. From screen 601 the information entered by the user, e.g., logged in as a specific type of user, or creates an account as a specific type of user, is processed and the user, depending upon whether logged in or not can be sent to the demo screen 602, the free version of the application screen 604, the premium version screen 606, or to a system owner screen 607. It being understood that there are many unique additional screens, information and materials that are contained within, or are available through, each of the screens 602, 603, 604. Further, it being understood that additional types of user screens, and corresponding information and materials can be used, e.g., public safety officials, building managers, first responders.

The anonymous browsing that is accessed through screen 603 can be for example:
Intended to allow a zero-commitment test drive
No account information • uses phone location as a default
All free functionality except:
  Only one Push Notification whenever the app is entered in AB mode, a single push notification is sent that illustrates what could be received if signed in with an account (free or otherwise)
  Wherever a location is required for functionality, the phone's location is used by default, and the option to enter an address is offered
  Whenever any data is entered (address. Group name. Group Members. Follow a news source or fire event, etc.), a reminder is shown stating that no data will be saved for future use unless signed in The free version of the application that is accessed through screen 604 can be for example:
Becomes the "trial" version because it offers a 'taste' of every premium feature, but there is no expiration
Partial account information—just email address and home address, mobile number
All Premium features with the following limitations:
  Only one home location
  Only one Emergency Group with only two members
  Only 1-2 News sources
  Only (2 or 3) Push notifications/month
When any feature limit above is reached, user is presented with option to have more with Premium The premium version of the application that is accessed through screen 606 can be for example:
All major features of the app
Complete account information, including payment
No limitations (we may want some limitations on number of groups, members, etc., but high enough that it full capacity is rarely used)

The system owner version of the application that is accessed through screen 607 can be for example:
All premium features of the application
Plus monitoring, control, and activation of a EFMS Example 5

Figure 6:
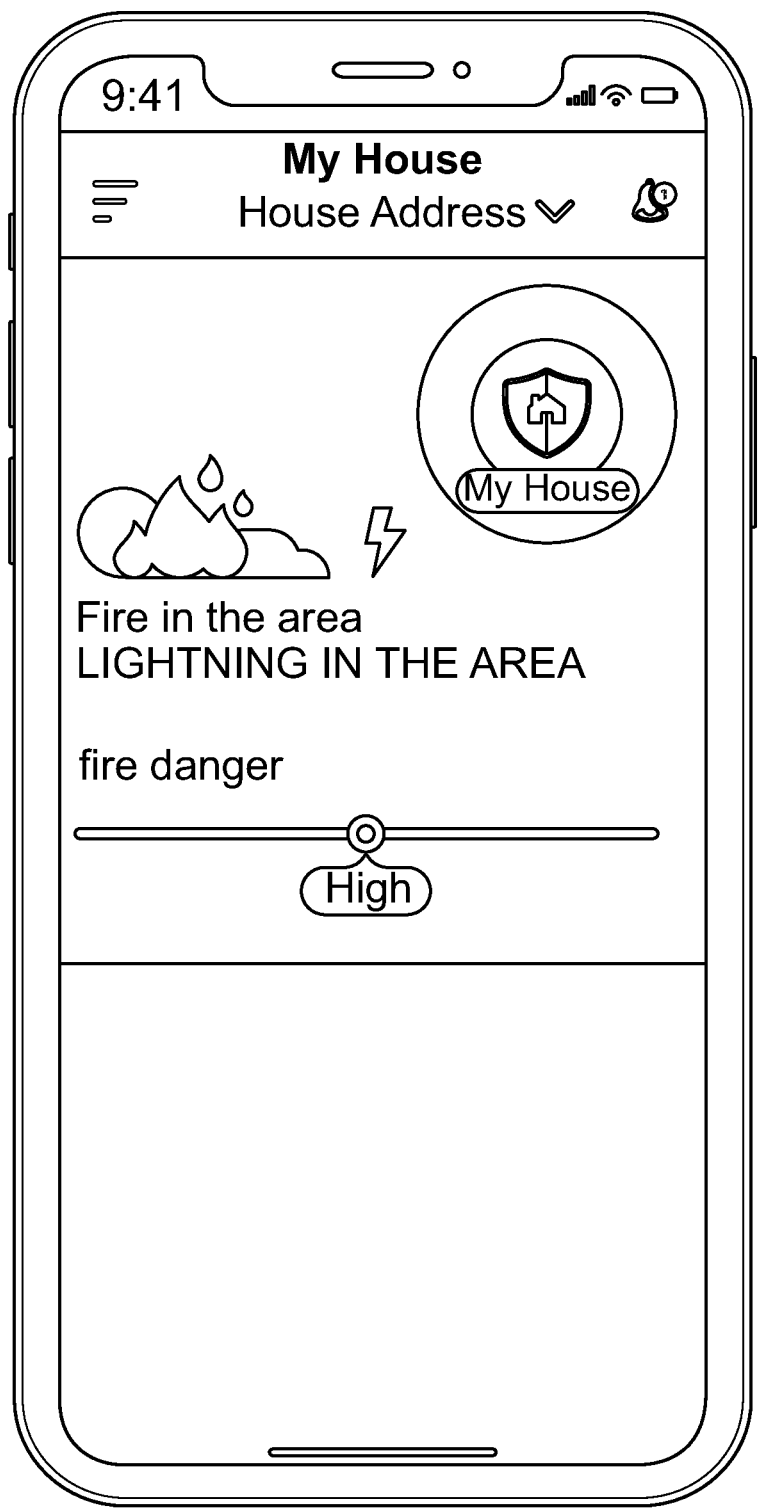
FIG. 6 is an embodiment of an image of GUI display in accordance with the present inventions.

Turning to FIG. 6 there is shown a screen and functionality for a unit functioning as an anonymous user on a node on the network. This screen is available to premium users and systems owners, and can also be available to free users.

Example 6

Figure 7:
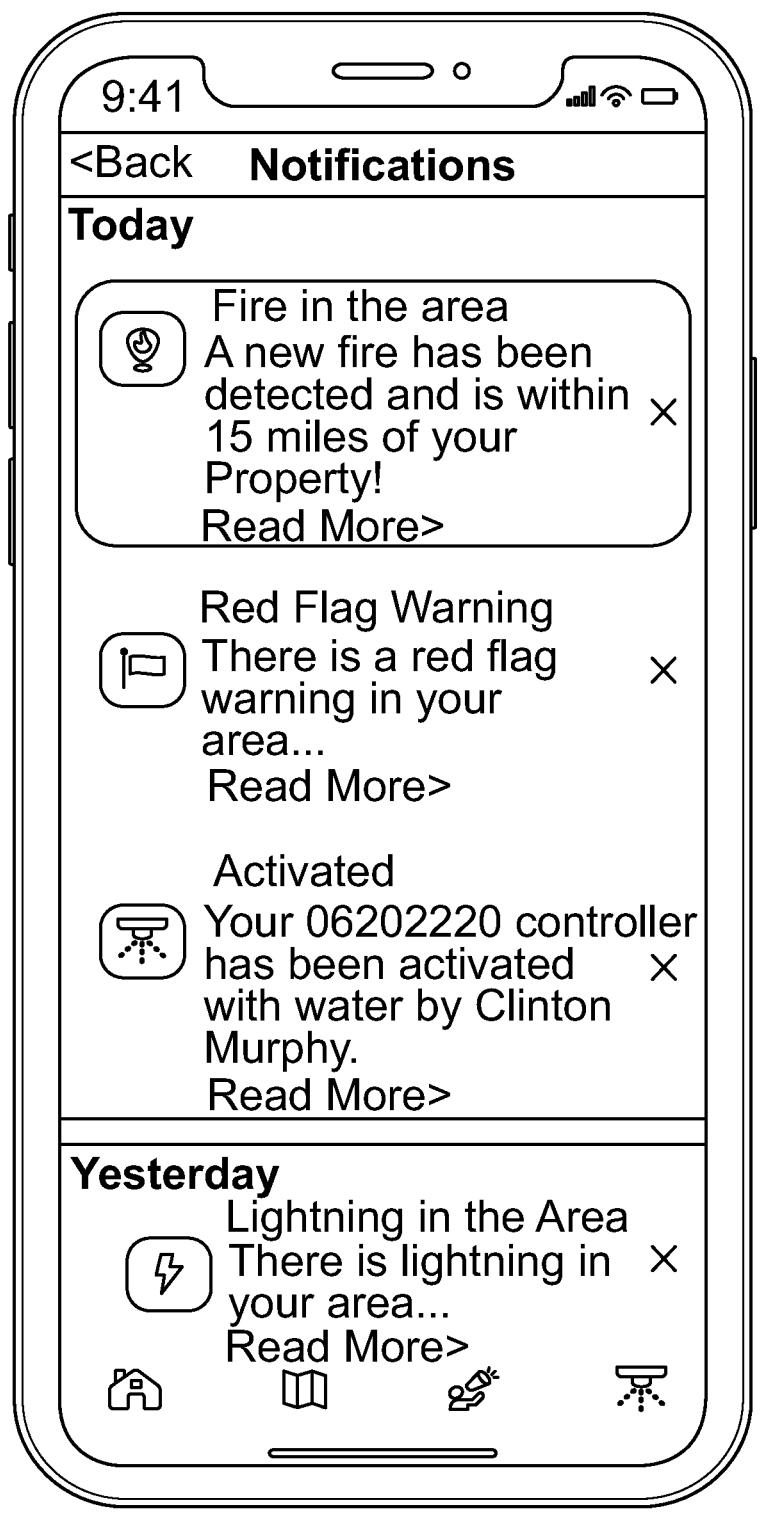
FIG. 7 is an embodiment of an image of GUI display in accordance with the present inventions

Turning to FIG. 7 there shown is a screen and functionality for a unit functioning as an anonymous user on a node on the network. This screen is available to systems owners.

Example 7

Figure 8:
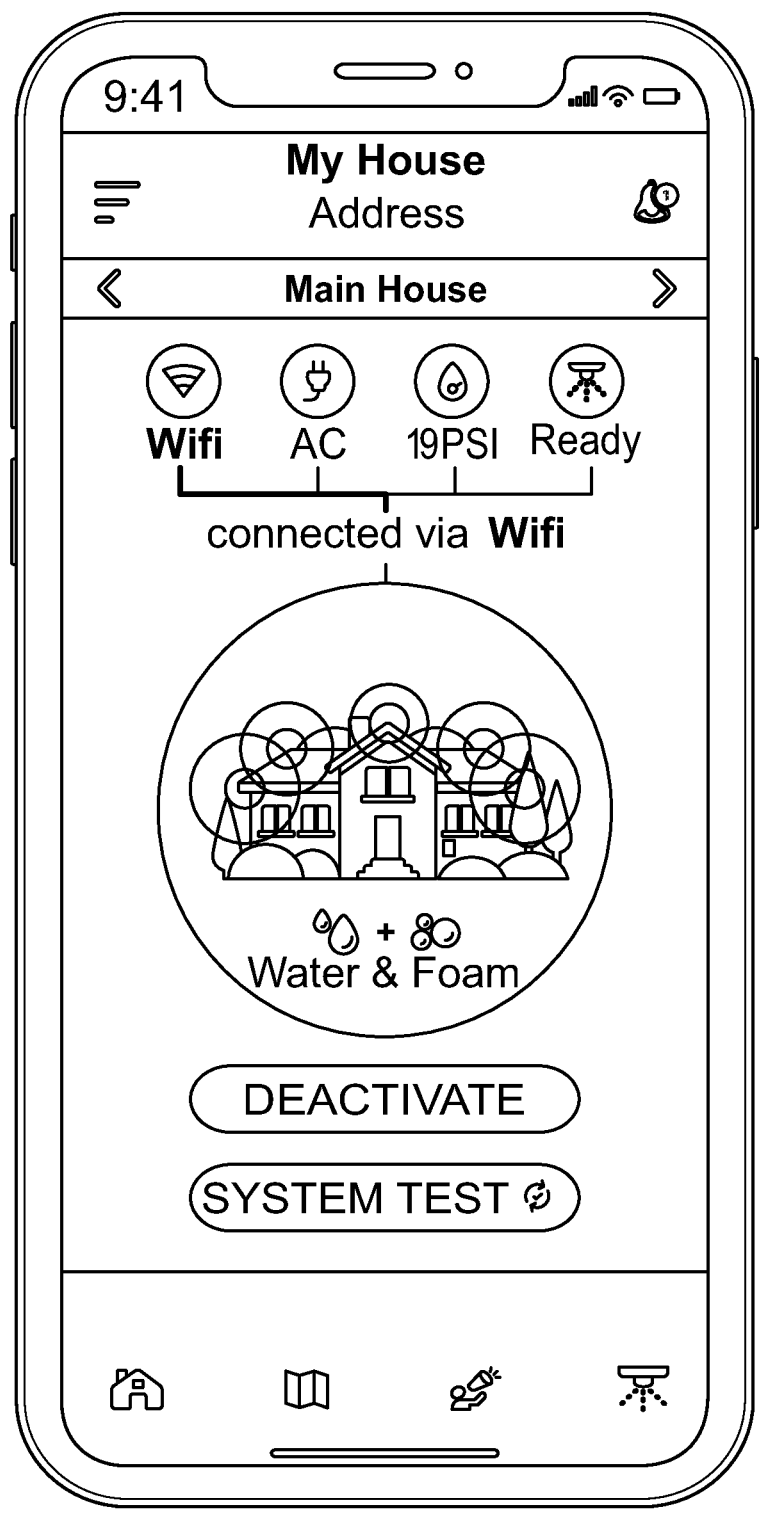
FIG. 8 is an embodiment of an image of GUI display in accordance with the present inventions.

Turning to FIG. 8 there is shown is a screen and functionality for a unit functioning as an anonymous user on a node on the network. This screen is available to systems owners.

Example 8

Figure 9:
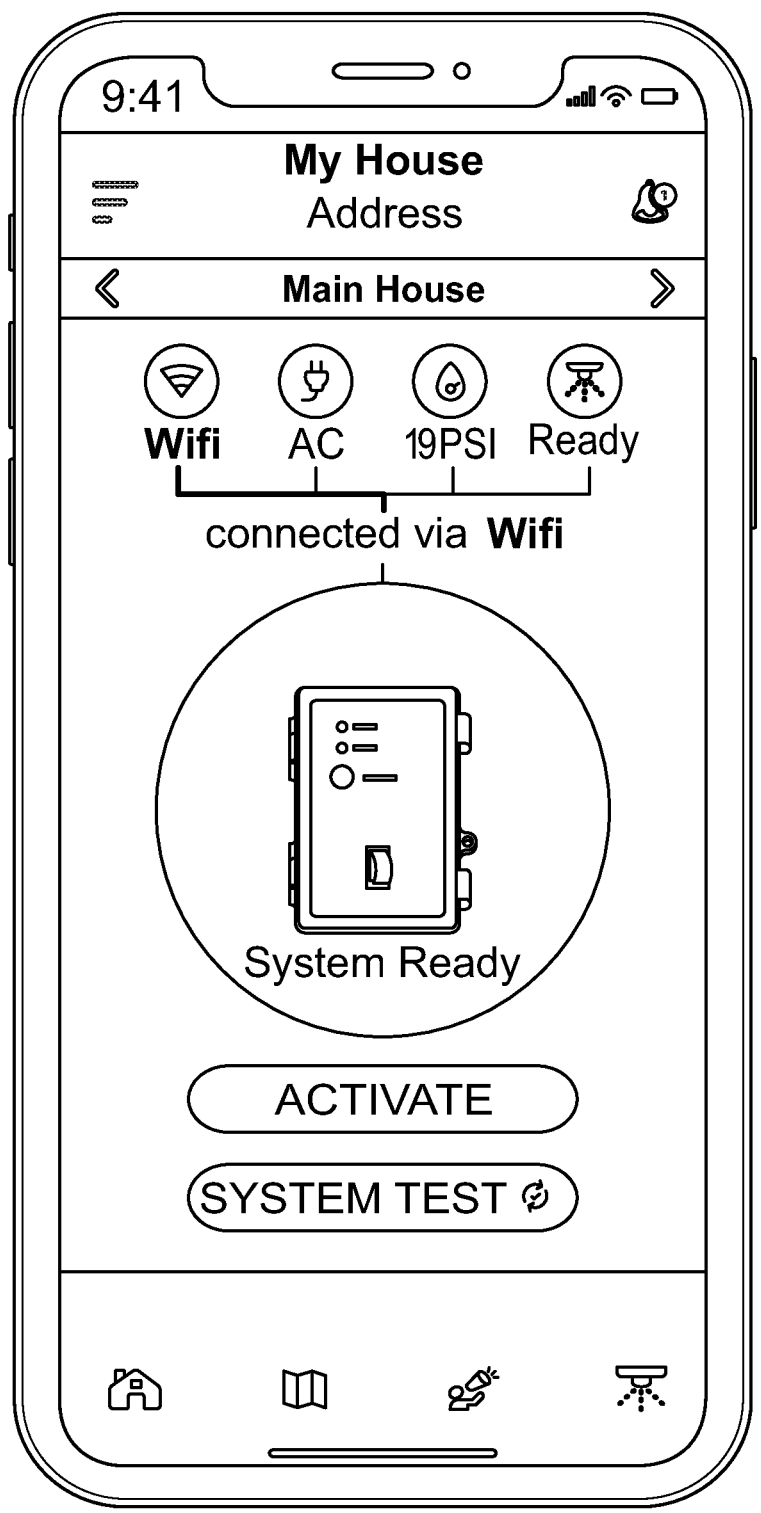
FIG. 9 is an embodiment of an image of GUI display in accordance with the present inventions.

Turning to FIG. 9 is a screen and functionality for a unit functioning as an anonymous user on a node on the network. This screen is available to systems owners.

Example 9

Figure 10:
FIG. 10 is an embodiment of an image of GUI display in accordance with the present inventions.

Turning to FIG. 10 there is shown a screen and functionality for a unit functioning as an anonymous user on a node on the network. This screen is available to premium users and systems owners, and can also be available to free users.

Example 10

Figure 11A:
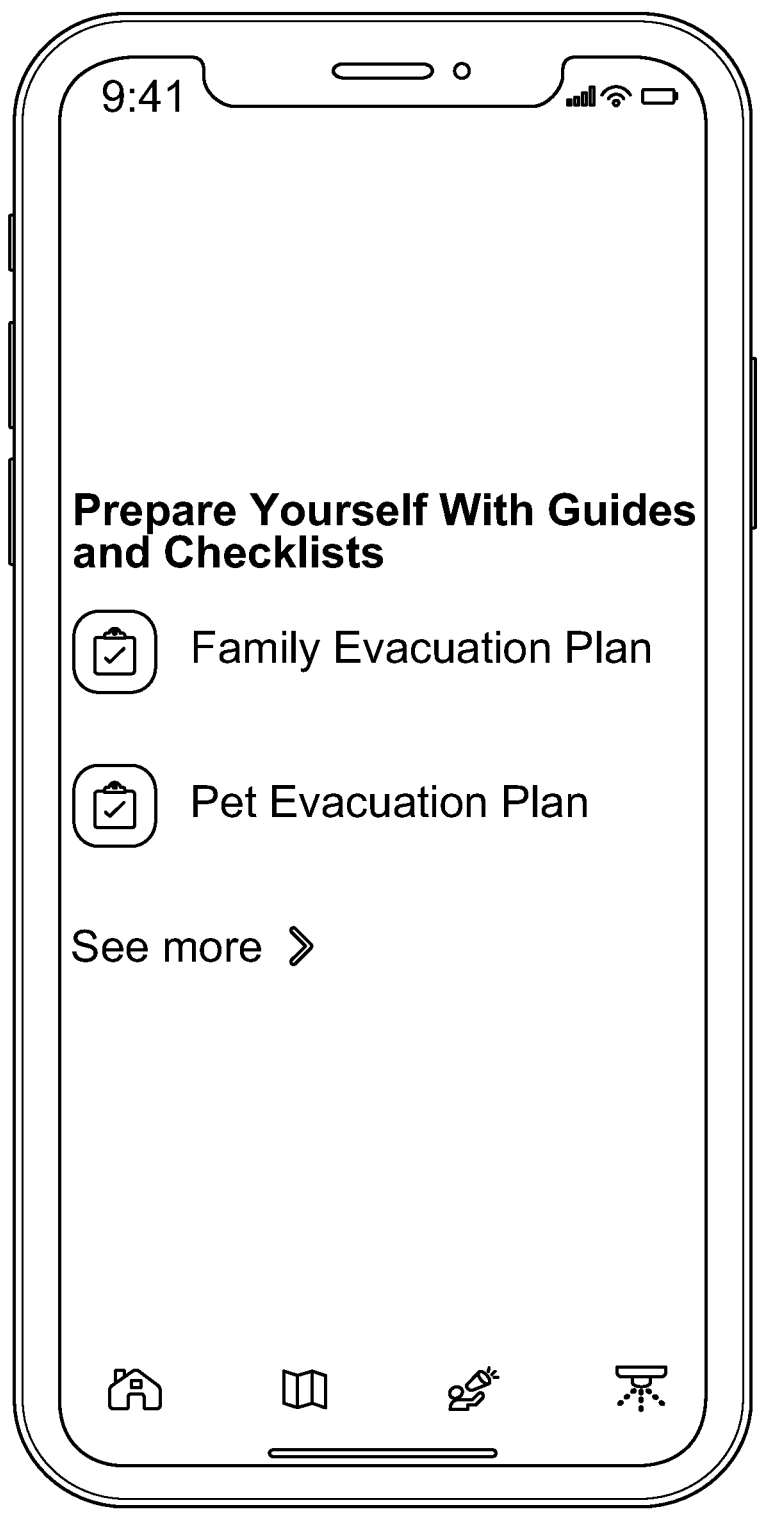
FIG. 11A i is an embodiment of an image of GUI display in accordance with the present inventions.
Figure 11B:
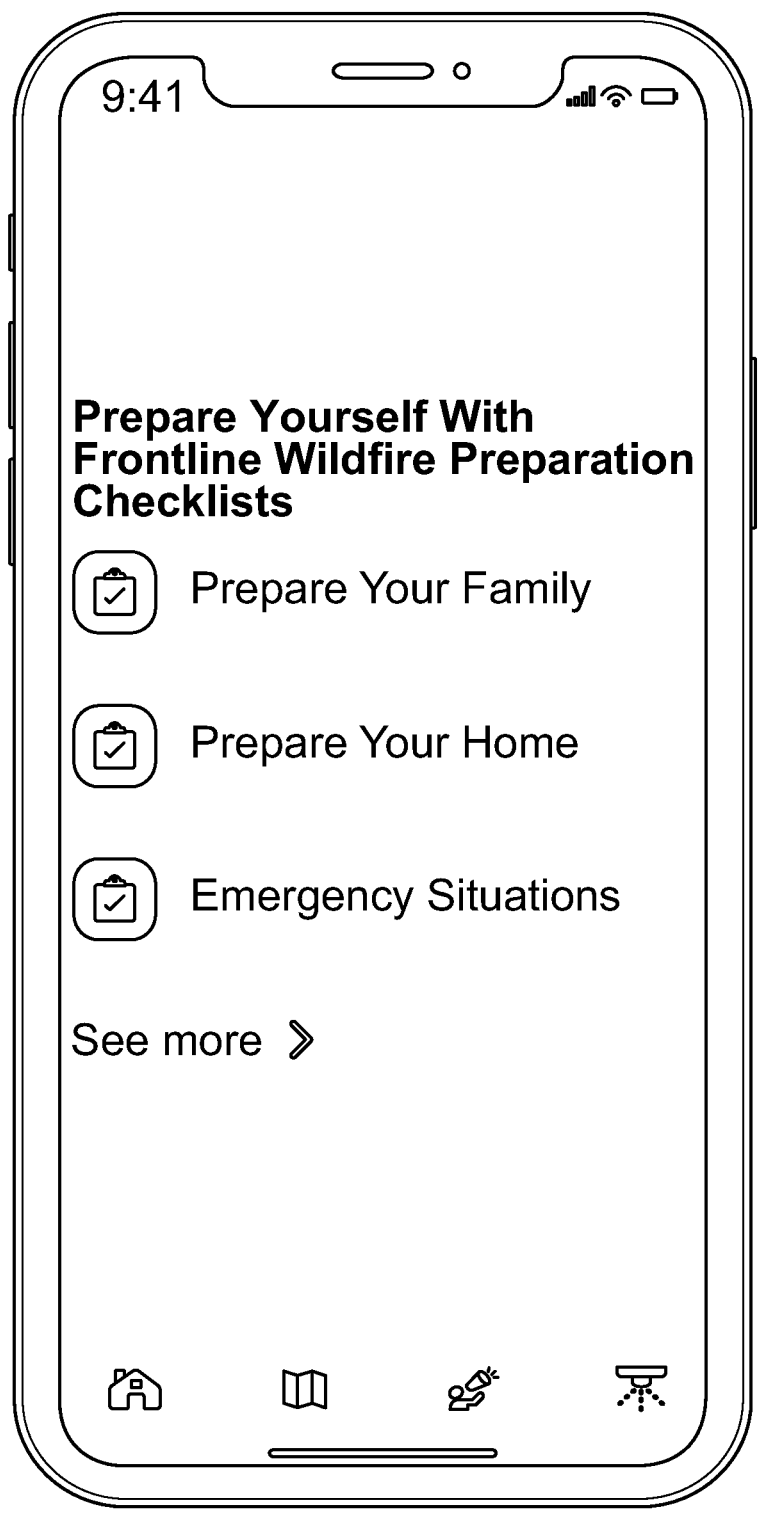
FIG. 11B is an embodiment of an image of GUI display in accordance with the present inventions.
Figure 11C:
FIG. 11C is an embodiment of an image of GUI display in accordance with the present inventions.

Turning to FIGS. 11A to 11C there is shown a screen and functionality for a unit functioning as an anonymous user on a node on the network. One or more of these screens is available to premium users and systems owners, but can also be available to free users.

Example 11

Screens and functionality for a unit functioning as an anonymous user on a node on the network can have access to and show maps, of the area, and these maps can contain information such as fire location, predicted path of fire, location of first responders, evacuation routes, etc. These screens are available to premium users and systems owners, and can also be available to free users.

Example 12

Figure 12:
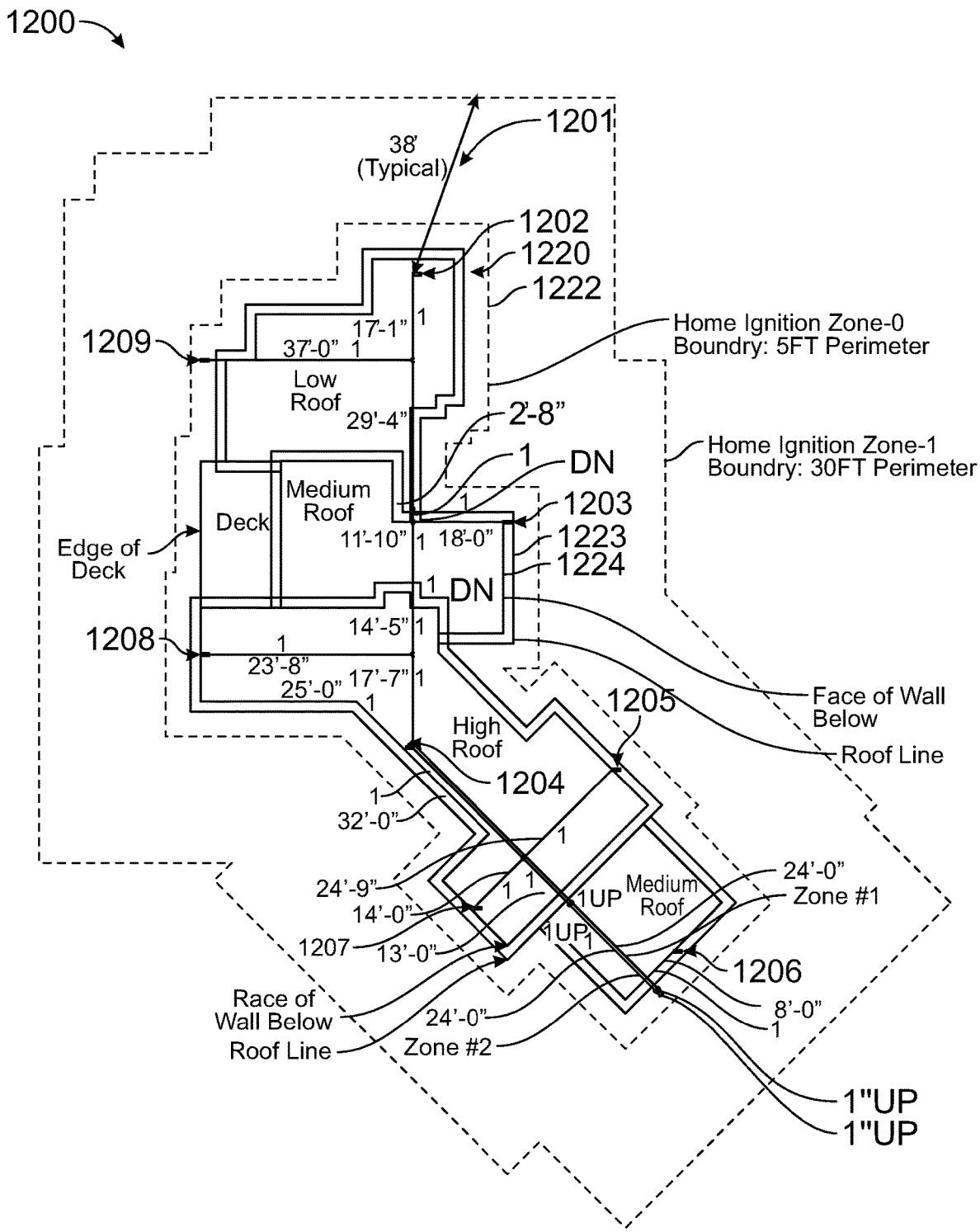
FIG. 12 is a schematic plan view of an embodiment of an EFMS that forms a node on embodiments of an emergency communications system, such as the system of FIG. 1B, in accordance with the present inventions.

Turning to FIG. 12 there is shown a schematic of an EFMS 1200. One, two, five, tens, hundreds and more can be part of an emergency management control network and system. The network can have EFMS of other configurations as well. The data processing assembly based upon raw data received from various nodes on the network processes the raw data to provide predictive information about the location and movement of a wildfire. The predictive information is communicated over the network. The predictive information can be a control command to a particular EFMS system, to arm, to operate, and to stop operations. This control command information can be sent to a group of EFMS in a nodal area.

System 1200 provides an outer coverage zone 1201 that has an outer boundary 1221. The boundary 1221 is 30 ft from the walls 1224 of the house. The system 1200 provides an inner coverage zone 1220, that has an inner boundary 1222. Boundary 1222 is 5 ft from the walls 1224. The system 1200 has distribution heads 1202, 1203, 1204, 1205, 1206, 1207, 1208, 1209. When the system is activated, these distribution heads provide foam, water and combinations of foam and water to zone, 1220, zone 1201, and combinations and variations of these zones. The system is installed in a house that has an outer roof line 1203, that extend outwardly from the outer walls 1224, and thereby defines an eave. The zones 1201 and 1220 can be further subdivided into sub-zones. In this manner the system can be operated to provide water, foam, etc. to various sub-zones and combinations of sub-zones.

Example 13

Figure 13:
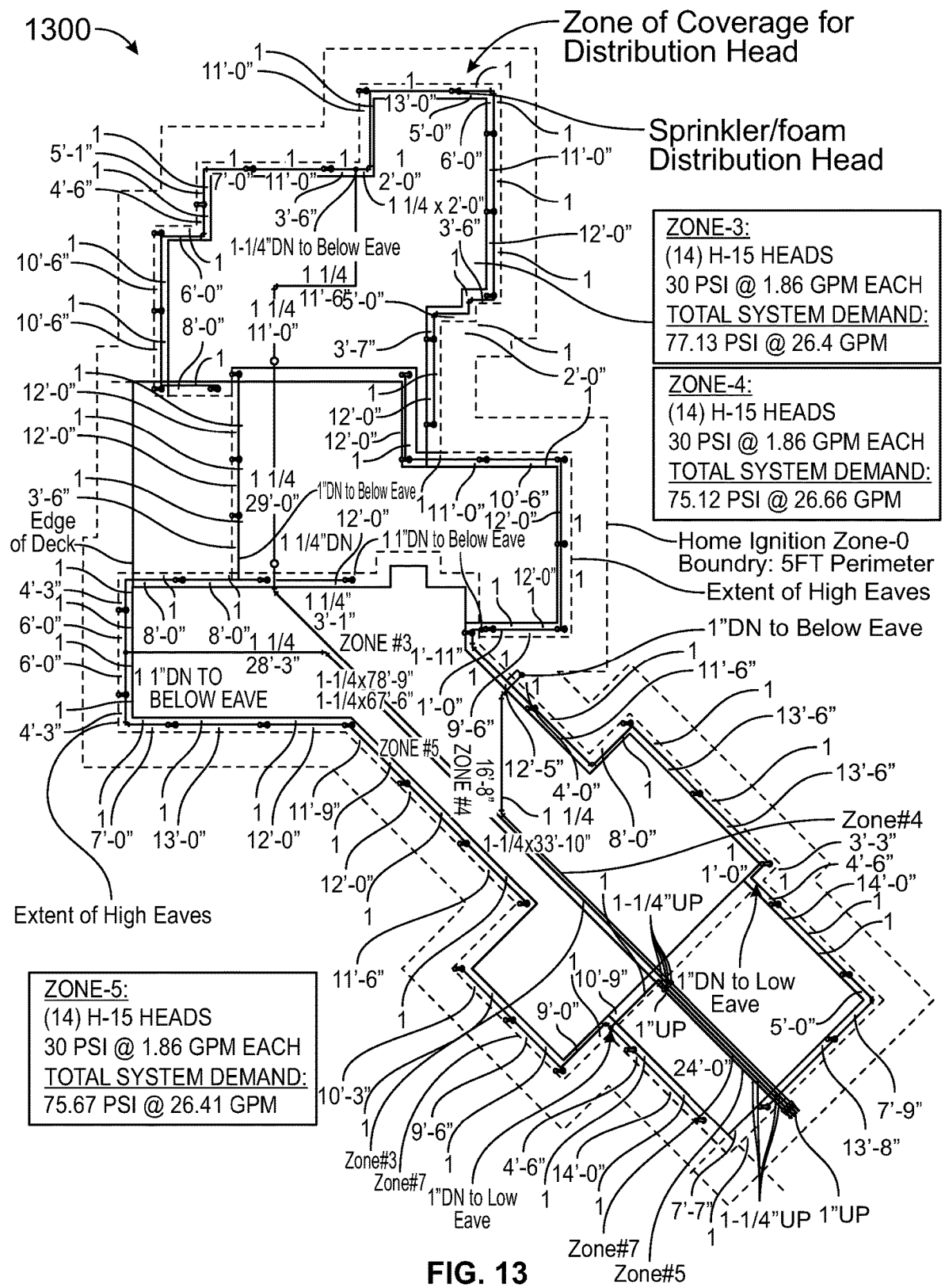
FIG. 13 is a schematic plan view of an embodiment of an EFMS that forms a node on embodiments of an emergency communications system, such as the system of FIG. 1B, in accordance with the present inventions.

In an embodiment there is provided an EFMS 1300 of the type shown in FIG. 13. System 1300 provides a coverage zone that has an outer boundary. The boundary is 5 ft from the walls of the house. The system 1300 has plurality of distribution heads. When the system is activated, these distribution heads provide foam, water and combinations of foam and water to the coverage zone and combinations and variations of these zones. The system is installed in a house that has an outer roof line, that extends outwardly from the outer walls, and thereby defines an eave. The zone can be further subdivide into sub-zones. In this manner the system can be operated to provide water, foam, etc. to various sub-zones and combinations of sub-zones.

Example 14

Figure 14:
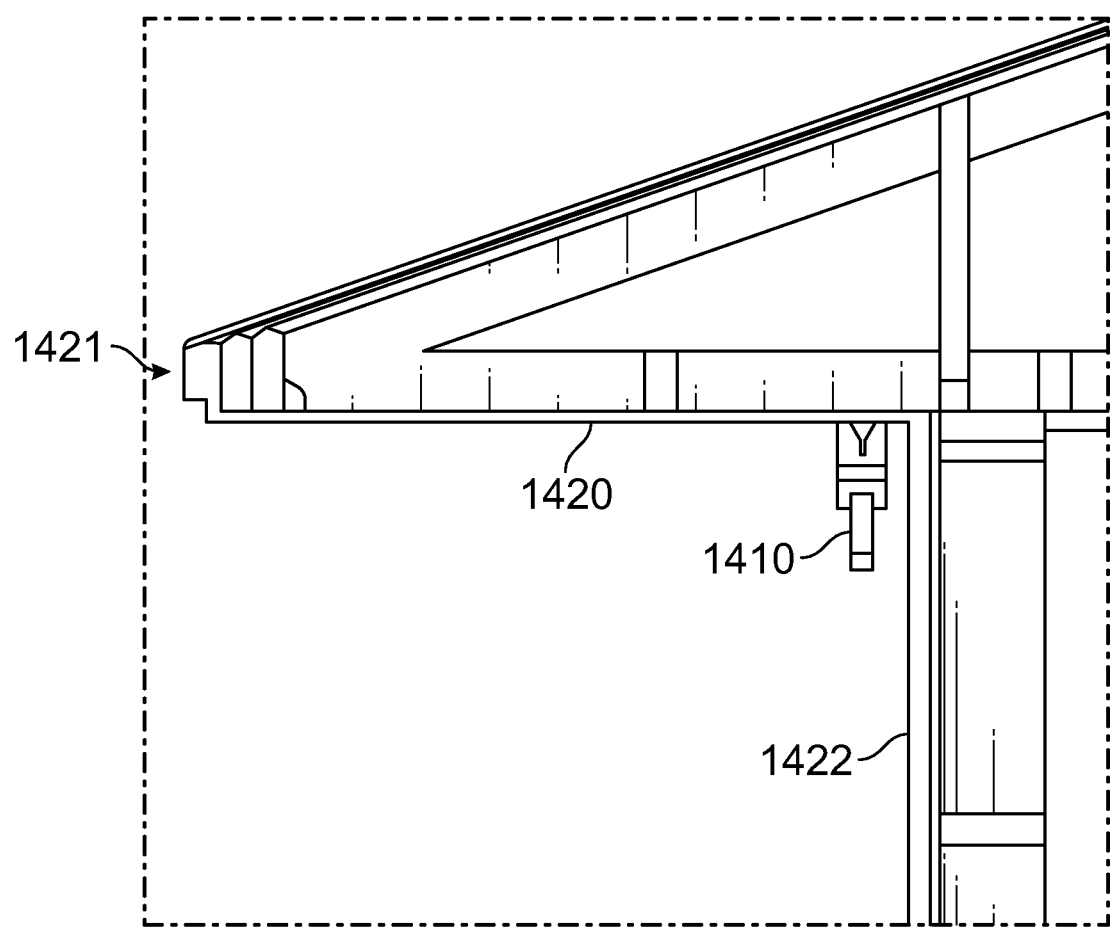
FIG. 14 is a schematic side view of an embodiment of an under eave distribution head configuration of an EFMS in accordance with the present inventions.

Turning to FIG. 14 there is a cross sectional schematic drawing of a distribution head 1410 installed under an eave 1420. There is also shown the outer roof line 1421, and a portion of the outer wall 1422.

Example 15

Figure 15:
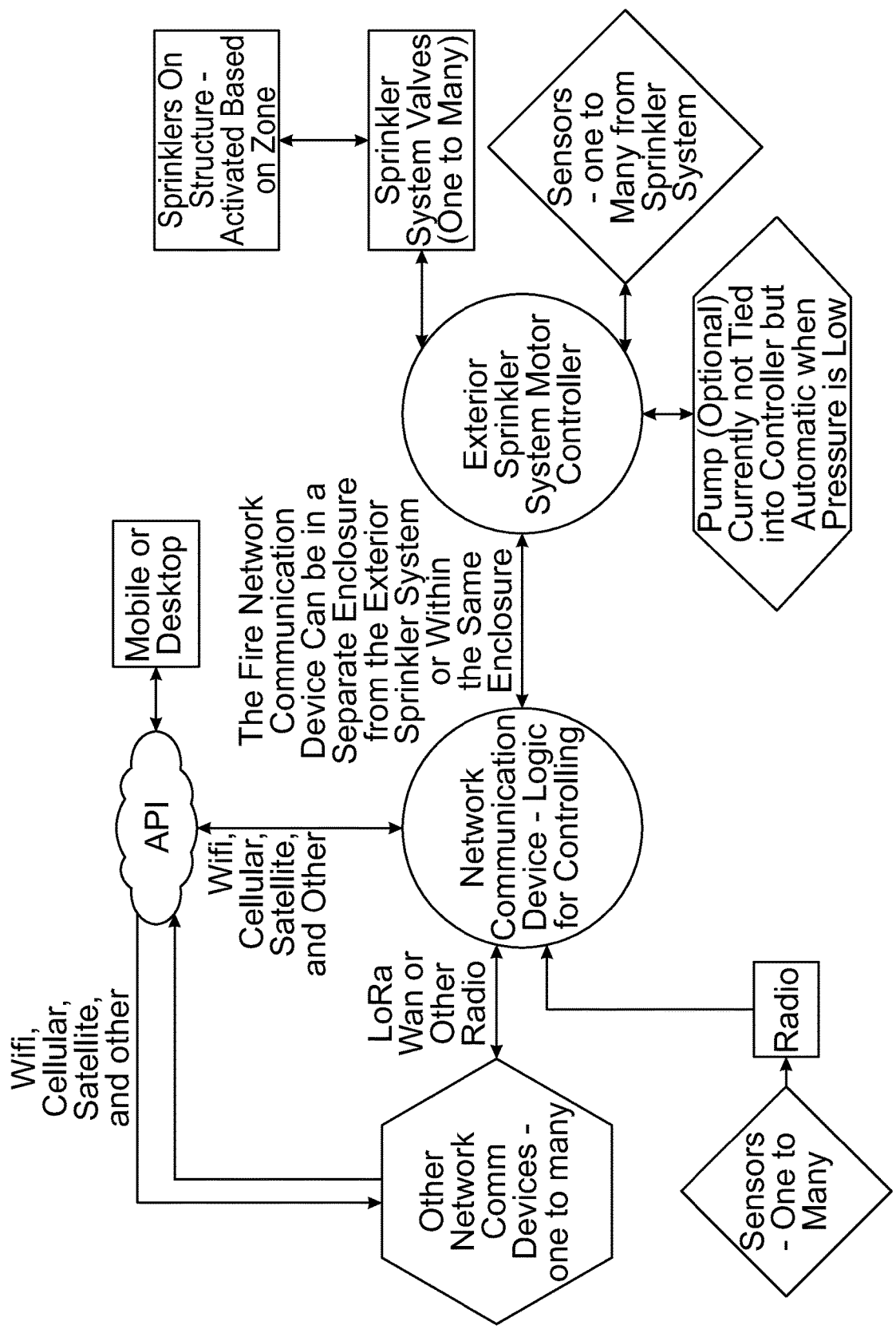
FIG. 15 is a flow diagram schematic view of an embodiment of an EMFS and its operation in accordance with the present inventions.

Turing to FIG. 15 there is shown a schematic flow diagram of an embodiment of an EFMS, which could be of the general type shown in the embodiments of FIG. 4, 12, or 13. In this system there are two controllers. A first controller (e.g., motor controller) having I/O connected to pumps valves and other sensors and device for the operation of the sprinklers and water, foam and both distribution. This first controller has a control program or control logic that controls the operation of the mechanical devices and sensors. The first control is in control communication with a second controller (e.g., Network Communication Device). This controller has a control program or control logic that can be an operating system. The second controller is configured for network communication to the cloud, pier to pier communication to other controllers in other EFMS, to make determinations based on fire, humidity, etc. sensors or other sources of data, and to provide instructions to the first controller. Thus, for example, the second controller based upon received information can make a determination to send an activation instruction to the first controller.

Example 16

Figure 17:
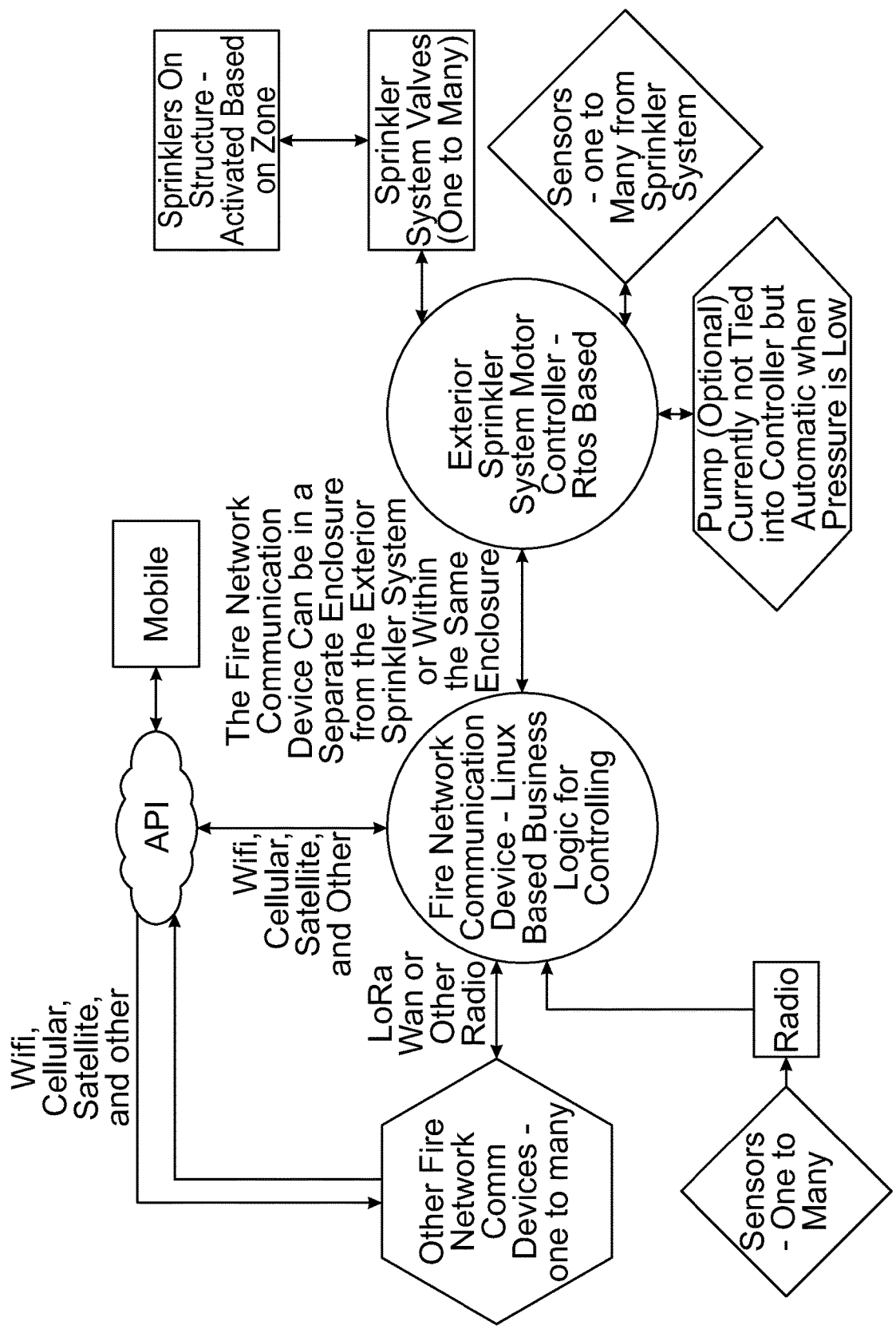
FIG. 17 is a flow diagram schematic view of an embodiment of an EMFS and its operation in accordance with the present inventions.

Turing to FIG. 17 there is shown a schematic flow diagram of an embodiment of an EFMS which could be of the general type shown in the embodiments of FIG. 4, 12, or 13. In this system there are two controllers. A first controller (e.g., motor controller) having I/O connected to pumps valves and other sensors and device for the operation of the sprinklers and water, foam and both distribution. This first controller has a control program or control logic that controls the operation of the mechanical devices and sensors. The first control is in control communication with a second controller (e.g., Network Communication Device). This controller has a control program or control logic that can be an operating system. The second controller is configured for network communication to the cloud, pier to pier communication to other controllers in other EFMS, to make determinations based on fire, humidity, etc. sensors or other sources of data, and to provide instructions to the first controller. Thus, for example, the second controller based upon received information can make a determination to send an activation instruction to the first controller.

Example 17

In embodiments the systems, e.g., an EFMS, the second controller of a two controller embodiment, such as the embodiment of Examples 15 or 16, the servers and processors in the cloud (e.g., API) can perform, require or both, validations before an EFMS is activated to disperse water, foam or both. Thus, if information is received indicating that a fire is near by the structure, this information held, and then validated with other information to confirm the accuracy of the initial information. One, two, three or more validations can be performed before an activation. Because these systems can have a large number of related inputs, the time for this validation will be very short. For example, less than 1 minute, less than 30 seconds, less than 15 seconds, less than 10 second. Moreover, this information can be stored and shared between EMFSs, the API, or other memory devices. This information will be location based. Thus, in this manner, in an embodiment, the validations can take place in even shorter periods and time, and essentially be instantaneous.

Example 18

An embodiment of the present networks and systems can be configured and implemented to manage a hurricane emergency.

Example 19

Figure 18:
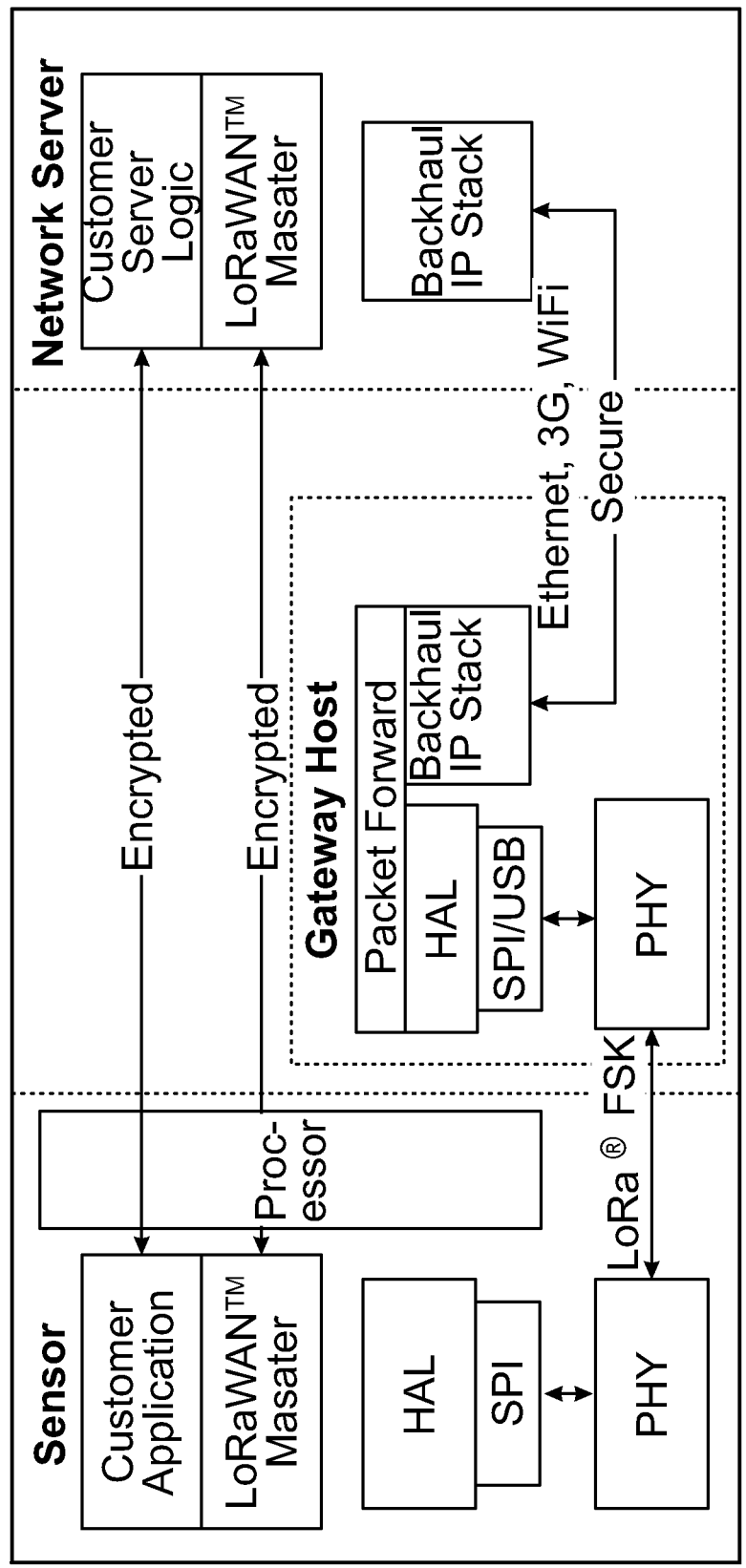
FIG. 18 is a schematic of an embodiment of a LoRa type system in accordance with the present inventions.

In an embodiment, enhancements in speed can be achieved by inter controller communication on the network. For example, one controller can let another controller know that it has activated, and if a second controller lets other controllers know it has been activated, then there is logic that can be applied to activate the controller receiving the activate information. The communication path for communicating between controllers does not need to be via the cloud, but rather through radio communication, such as a LoRa type system, including LoRaWAN®. FIG. 18 provides a schematic of an example of an architecture for LoRa type system.

Example 20

An embodiment of an EMFS, systems of Examples 15 and 16 uses a LoRaWAN® network architecture. In an embodiment this architecture is deployed in a star-of-stars topology in which gateways relay messages between end-devices and a central network server. The gateways are connected to the network server via standard IP connections and act as a transparent bridge, simply converting RF packets to IP packets and vice versa. The wireless communication takes advantage of the Long Range characteristics of the LoRaO physical layer, allowing a single-hop link between the end-device and one or many gateways. All modes are capable of bi-directional communication, and there is support for multicast addressing groups to make efficient use of spectrum during tasks such as Firmware Over-The-Air (FOTA) upgrades or other mass distribution messages.

In an embodiment the EMFS, for use in this Example, is for instance one of the type of systems of Examples 15 and 16.

Example 21

Figure 16:
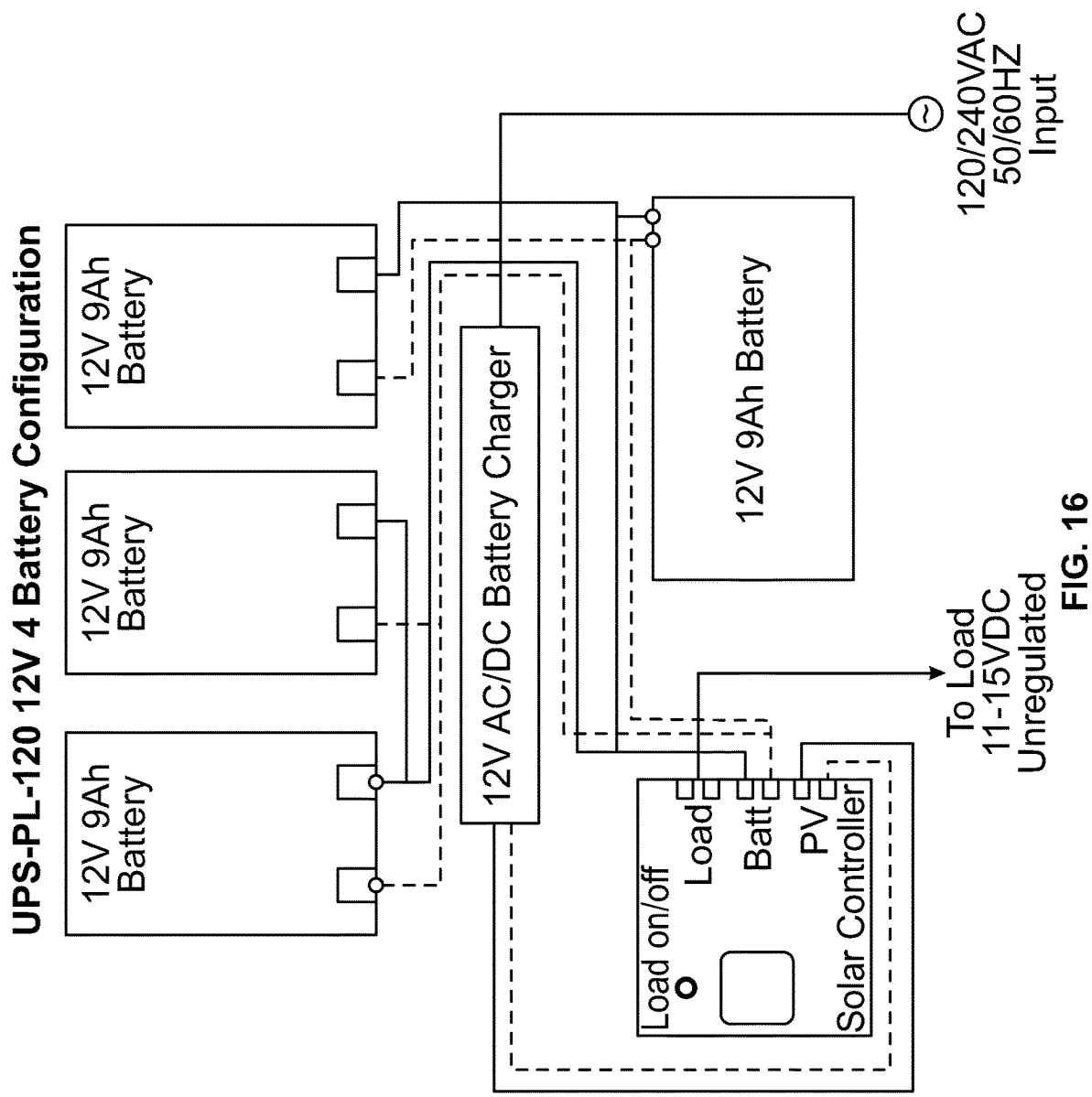
FIG. 16 is a schematic of an embodiment of a universal power supply (UPS) for use with embodiments of an EFMS in accordance with the present inventions.

An embodiment of the EMFS system has a UPS of the type shown in FIG. 16. The output from the UPS is always drawing from the batteries, and the AC is used to maintain and top off the batteries. The EMFS system in this Example, could be of the type in FIG. 4, 12 or 13.

It is noted that there is no requirement to provide or address the theory underlying the novel and groundbreaking performance or other beneficial features and properties that are the subject of, or associated with, embodiments of the present inventions. Nevertheless, various theories are provided in this specification to further advance the art in this important area, and in particular in the important area of lasers, laser processing and laser applications. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the operation, function and features of embodiments of the methods, articles, materials, devices and system of the present inventions; and such later developed theories shall not limit the scope of protection afforded the present inventions.

The various embodiments of networks, systems for providing and displaying data and information set forth in this specification may be used in the above identified fields and in various other fields. Additionally, these embodiments, for example, may be used with: existing networks, emergency systems, social media systems, alert systems, broadcast systems, as well as other existing equipment; future systems and activities; and such items that may be modified, in-part, based on the teachings of this specification. Further, the various embodiments set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combinations, e.g., A, C, D, and A. A" C and D, etc., in accordance with the teaching of this Specification. The scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A system for obtaining, evaluating and displaying in a predictive manner, information and data regarding fire emergencies, the system comprising:
   a. a plurality of units configured to provide raw data regarding a fire;
      i. wherein each unit comprises a communication node on a communication network;
      ii. wherein at least one of the plurality of units is a mobile unit, comprising a processor and a GUI; and,
      iii. wherein at least one of the plurality of units is a fixed unit comprising a processor and a GUI;
   b. a source of derived data regarding one or more of the fire location, a weather condition, a fire movement, a path of a fire, a traffic condition, available water, water usage, a power grid, and electrical usage;
      i. wherein the source of derived data comprises a communication node on the communication network;
   c. a processor comprising a communication node on the communication network, thereby placing the processor in communication with the source of derived data and at least one of the plurality of units;
   d. the processor configured to perform a first predictive computation to determine a change of state event from the raw data and the derived data;
   e. whereby the processor determines predictive information comprising a probability for the change of state event, and wherein the processer is configured to communicate the predictive information to the network, for display by one or more of the units; and,
   f. an external fire management system (EFMS); wherein the EFMS is a communication node on the communication network, and wherein the EFMS is configured to protect a structure from a wildfire.

2. The system of claim 1, wherein the raw data comprises one or more of a location of a fire, a location of smoke, a location of embers, a direction of movement of a fire, and an evacuation route.

3. The system of claim 2, wherein the at least one of the plurality of units is also a source of derived data.

4. The system of claim 3, wherein the fixed unit is the EFMS.

5. The system of claim 1, wherein at least one of the plurality of units comprises a unit selected from the group consisting of cell tower, a traffic camera, a cell phone, an automobile navigation system.

6. The system of claim 1, further comprising at least ten external fire management systems (EFMSs), wherein the at least ten EFMSs are all located within a 10 mile radius, and thereby define a nodal area.

7. The system of claim 6, wherein the predictive information is specific to the nodal area.

8. The system of claim 6, wherein the predictive information is specific to the nodal area; wherein one or more of the mobile devices is associated with the nodal area; and wherein the nodal area specific predictive information is communicated to the mobile devices associated with the nodal area.

9. The system of claim 6, wherein the predictive information is specific to the nodal area; and wherein the specific predictive information comprises a notice to activate one or more of the EFMSs; and wherein one or more of the EFMSs is automatically activated by the system.

10. The system of claim 1, wherein at least one of the mobile units comprises a GUI configure to display at least one of the functionalities: a fire locations; I see fire; fire;

heavy smoke; embers; fire danger; no fires in area; smoke in area; fire in area; fire nearby; track a wildfire; hotspots.

11. The system of claim 1, wherein at least one of the mobile units comprises a GUI configure to display at least one of the functionalities: emergency management alert; fire department alert; wildfire distance alert; and fire emergency checklist.

12. The system of claim 1, wherein at least one of the mobile units comprises a GUI configure to display at least one of the functionalities: external fire management system (EFMS) status; EFMS system ready; EFMS sprinklers; activate systems; fire department alert; wildfire distance alert; and fire emergency checklist.

13. The system of claim 1, wherein the network is a peer to peer network having a plurality of external fire management systems (EFMSs) control systems in direct communication with each other, using a communication protocol.

14. A system for obtaining, evaluating and displaying information and data regarding wildfires, external fire management systems (EFMSs) and mobile units, the system comprising:
 a. a plurality of mobile units configured to receive and transmit information, data or both regarding a wildfire and a status of an external fire management system (EFMS), over a network;
  i. wherein the units comprise a node on the network;
  ii. wherein the units comprise a means to determine the location of the unit;
  iii. wherein the units comprising a processor, a memory device and a GUI;
  iv. wherein the information or data comprises one or more of a location of a fire, a location of smoke, a location of embers, a direction of movement of a fire, and an evacuation route;
 b. a plurality of fixed units configured to receive and transmit information and data over the network;
  i. wherein each unit comprises a node on the network;
  ii. wherein each units comprising a processor and a memory device; and,
  iii. wherein each unit is a component of an external fire management system (EFMS), wherein the EFMS is configured to protect a structure from a wildfire; and,
 c. wherein at least one of the mobile units is in control communication with at least one of the fixed units.

15. The system of claim 14, wherein the information or data comprises one or more of a location of a fire, a location of smoke, a location of embers, a direction of movement of a fire, and an evacuation route.

16. The system of claim 14, wherein the fixed units comprise a GUI.

17. The system of claim 14, further comprising at least ten external fire management systems (EFMSs) all located within a 5 mile radius and thereby define a nodal area.

18. The system of claim 17, wherein the information, data or both is specific to the nodal area; and wherein the specific information, data or both comprises a notice to activate one or more of the EFMSs, and the activation notice appears on a mobile unit associated with the nodal area.

19. The system of claim 14, wherein at least one of the mobile units is configured for, and thereby in, direct communication with one or more predetermined unit; thereby defining a unit to unit communication pathway; wherein the unit to unit communication pathway is private.

20. The system of claim 14, wherein the network is a peer to peer network having a plurality of EFMSs control systems in direct communication with each other, using a communication protocol, wherein the protocol does not require the internet.

21. A system for obtaining, evaluating and displaying in a predictive manner, information and data regarding an emergency, the system comprising:
 a. a plurality of units configured to provide raw data regarding the emergency;
  i. wherein each unit comprises a communication node on a communication network;
  ii. wherein at least one of the plurality of units is a mobile unit, comprising a processor and a GUI; and,
  iii. wherein at least one of the plurality of units is a fixed unit comprising a processor and a GUI;
 b. a source of derived data regarding one or more of a weather condition, a water level, a tidal condition, a seismic activity, a geologic condition, a river level, a traffic condition, water usage, an electrical usage, and an electric grid;
  i. wherein the source of derived data comprises a communication node on the communication network;
 c. a processor comprising a communication node on the communication network, thereby placing the processor in communication with the source of derived data and at least one of the plurality of units;
 d. the processor configured to perform a first predictive computation to determine a change of state event from the raw data and the derived data;
 e. whereby the processor determines predictive information comprising a probability for the change of state event, and wherein the processor communicates the predictive information to the network, for display by one or more of the units; and,
 f. an external fire management system (EFMS); wherein the EFMS is a communication node on the communication network, and wherein the EFMS is configured to protect a structure from a wildfire.

22. The system of claim 21, wherein the network is a peer to peer network having a plurality of external fire management systems (EFMSs) control systems, having a local controller, in direct communication with each other, using a communication protocol, wherein the protocol LoRa.

23. A system for obtaining, evaluating and displaying information and data regarding emergencies and mobile units, the system comprising:
 a. a plurality of mobile units configured to receive and transmit information, data or both regarding an emergency over a network;
  i. wherein the units comprise a node on the network;
  ii. wherein the units comprise a means to determine the location of the unit;
  iii. wherein the unit comprising a processor, a memory device and a GUI;
  iv. wherein the information or data comprises one or more of a weather condition, a water level, a tidal condition, a seismic activity, a geologic condition, a river level, a traffic condition, water usage, an electrical usage, and an electric grid;
 b. a plurality of fixed units configured to receive and transmit information and data over the network;
  i. wherein each unit comprises a node on the network;
  ii. wherein each units comprising a processor and a memory device; and,
  iii. wherein at least one of the fixed units is an external fire management system (EFMS) configured to protect a structure from a wildfire; and, c. wherein at least one of the mobile units is in control communication with the EFMS.

24. The system of claim 23, wherein the mobile unit is configure so that raw data is inputted by a user of the mobile unit.

25. The system of claim 23, wherein the network is a LoRaWAN® network architecture having a plurality of external fire management systems (EFMSs) controllers in direct communication with each other, using a communication protocol, wherein the protocol LoRa.

26. An integrated system comprising a network having a plurality of nodes on the network, the integrated system comprising:
   a. a plurality of nodes on a network;
   b. a first node of the plurality of nodes associated with an external fire management system (EFMS), wherein the EFMS is associated with a structure, and wherein the EFMS is configured to protect the structure from a wildfire;
   c. a second node of the plurality of nodes associated with a first mobile device having a first GUI;
   d. a third node of the plurality of nodes associated with a second mobile device having a second GUI;
   e. a fourth node of the plurality of nodes associated with a data processing assembly; whereby the data processing assembly is in communication with the EFMS, the first mobile device and the second mobile device;
   f. wherein the first and the second GUI comprises configurations to display an output, receive an input, or both of at least three of the functionalities of: fire location; I see fire; fire; heavy smoke; embers; fire danger; no fires in area; smoke in area; fire in area; fire nearby; track a wildfire; hotspots; and,
   g. wherein the second GUI comprises configurations to display an output, receive an input, or both of at least three of the functionalities of: EFMS status; EFMS system ready; EFMS sprinklers; activate systems; fire department alert; wildfire distance alert; and fire emergency checklist.

* * * * *